United States Patent
Lau

(10) Patent No.: US 11,754,672 B2
(45) Date of Patent: Sep. 12, 2023

(54) RADAR CROSS SECTION COMPENSATION FOR CALIBRATION OF VEHICLE RADAR

(71) Applicant: GM Cruise Holdings LLC, San Francisco, CA (US)

(72) Inventor: Zhi Yuan Sherwin Lau, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 1130 days.

(21) Appl. No.: 16/410,732

(22) Filed: May 13, 2019

(65) Prior Publication Data
US 2020/0363500 A1 Nov. 19, 2020

(51) Int. Cl.
| G01S 7/40 | (2006.01) |
| G01S 7/497 | (2006.01) |
| G01S 7/52 | (2006.01) |
| G01S 13/931 | (2020.01) |

(52) U.S. Cl.
CPC ............ G01S 7/40 (2013.01); G01S 7/497 (2013.01); G01S 7/52004 (2013.01); G01S 13/931 (2013.01); G01S 2013/9323 (2020.01); G01S 2013/9324 (2020.01)

(58) Field of Classification Search
CPC ... G01S 7/40–4095; G01S 7/497–4972; G01S 7/52004; G01S 13/931; G01S 2013/9323; G01S 2013/9324
USPC .......................................................... 342/174
See application file for complete search history.

(56) References Cited

U.S. PATENT DOCUMENTS

| 5,977,906 | A | * | 11/1999 | Ameen | ................. | G01S 13/931 |
| | | | | | | 342/174 |
| 6,714,156 | B1 | * | 3/2004 | Ibrahim | ................ | G01S 7/4026 |
| | | | | | | 342/174 |
| 7,688,257 | B1 | | 3/2010 | Christianson et al. | | |
| 8,847,816 | B2 | * | 9/2014 | Feil | ........................ | G01F 23/284 |
| | | | | | | 342/174 |
| 10,746,858 | B2 | * | 8/2020 | Bradley | .................. | G01S 17/42 |

(Continued)

FOREIGN PATENT DOCUMENTS

| CN | 107861106 A | 3/2018 | | |
| EP | 3364212 A1 | * | 8/2018 | ............. G01S 13/90 |

OTHER PUBLICATIONS

Harter M., et al., "Self-Calibration of a 3-D-Digital Beamforming Radar System for Automotive Applications With Installation Behind Automotive Covers," IEEE Transactions on Microwave Theory and Techniques, Plenum, USA, vol. 64(9), Sep. 1, 2016, pp. 2994-3000.

(Continued)

*Primary Examiner* — Matthew M Barker
(74) *Attorney, Agent, or Firm* — Novak Druce Carroll LLP

(57) ABSTRACT

One or more radar sensors coupled to a vehicle receive readings during a calibration time period. Each radar sensor receives data covering a field of view of the sensor, which may be split into angle-based bins. A noise-reducing filter (e.g., median filter) may be applied. A function is generated by processing raw radar cross section (RCS) returns into values plotted against angles compared to the direction that the sensor is facing. The function may be smoothed. Radar sensor measurements captured after calibration are corrected using the function, for example by automatically subtracting or dividing amounts corresponding to the function.

18 Claims, 18 Drawing Sheets

(56) References Cited

U.S. PATENT DOCUMENTS

| | | | |
|---|---|---|---|
| 10,852,731 B1* | 12/2020 | Braley | G07C 5/0808 |
| 10,866,305 B1 | 12/2020 | Campbell et al. | |
| 11,009,594 B2* | 5/2021 | Valois | G01S 7/497 |
| 11,435,456 B2* | 9/2022 | Abari | G01S 17/931 |
| 2008/0018523 A1* | 1/2008 | Kelly, Jr. | G01S 7/354 |
| | | | 342/21 |
| 2013/0088382 A1* | 4/2013 | Lee | G01S 7/4026 |
| | | | 342/174 |
| 2014/0139366 A1* | 5/2014 | Moses | G01S 13/933 |
| | | | 342/63 |
| 2015/0070207 A1* | 3/2015 | Millar | G01S 13/4454 |
| | | | 342/174 |
| 2016/0334511 A1 | 11/2016 | Ling | |
| 2017/0212214 A1 | 7/2017 | Murali et al. | |
| 2017/0343654 A1* | 11/2017 | Valois | G01S 17/931 |
| 2019/0056483 A1* | 2/2019 | Bradley | G01S 7/4815 |
| 2019/0056484 A1* | 2/2019 | Bradley | G01S 7/4815 |
| 2019/0107615 A1 | 4/2019 | Eljarat et al. | |
| 2019/0204425 A1* | 7/2019 | Abari | G01S 7/497 |
| 2019/0204427 A1* | 7/2019 | Abari | G01S 17/86 |
| 2019/0353778 A1 | 11/2019 | Slutsky et al. | |
| 2020/0174107 A1* | 6/2020 | Briggs | G06T 7/50 |
| 2020/0309903 A1* | 10/2020 | Degani | G01S 13/42 |

OTHER PUBLICATIONS

International Search Report and Written Opinion for International Application No. PCT/US2019/068310, dated Apr. 8, 2020, 12 pages.

S. Lim, S. Lee, and S. -C. Kim, "Clustering of Detected Targets Using DBSCAN in Automotive Radar Systems," 2018 19th International Radar Symposium (IRS), Bonn, Germany, 2018, pp. 1-7, doi: 10.23919/IRS.2018.8448228. (Year: 2018).

* cited by examiner

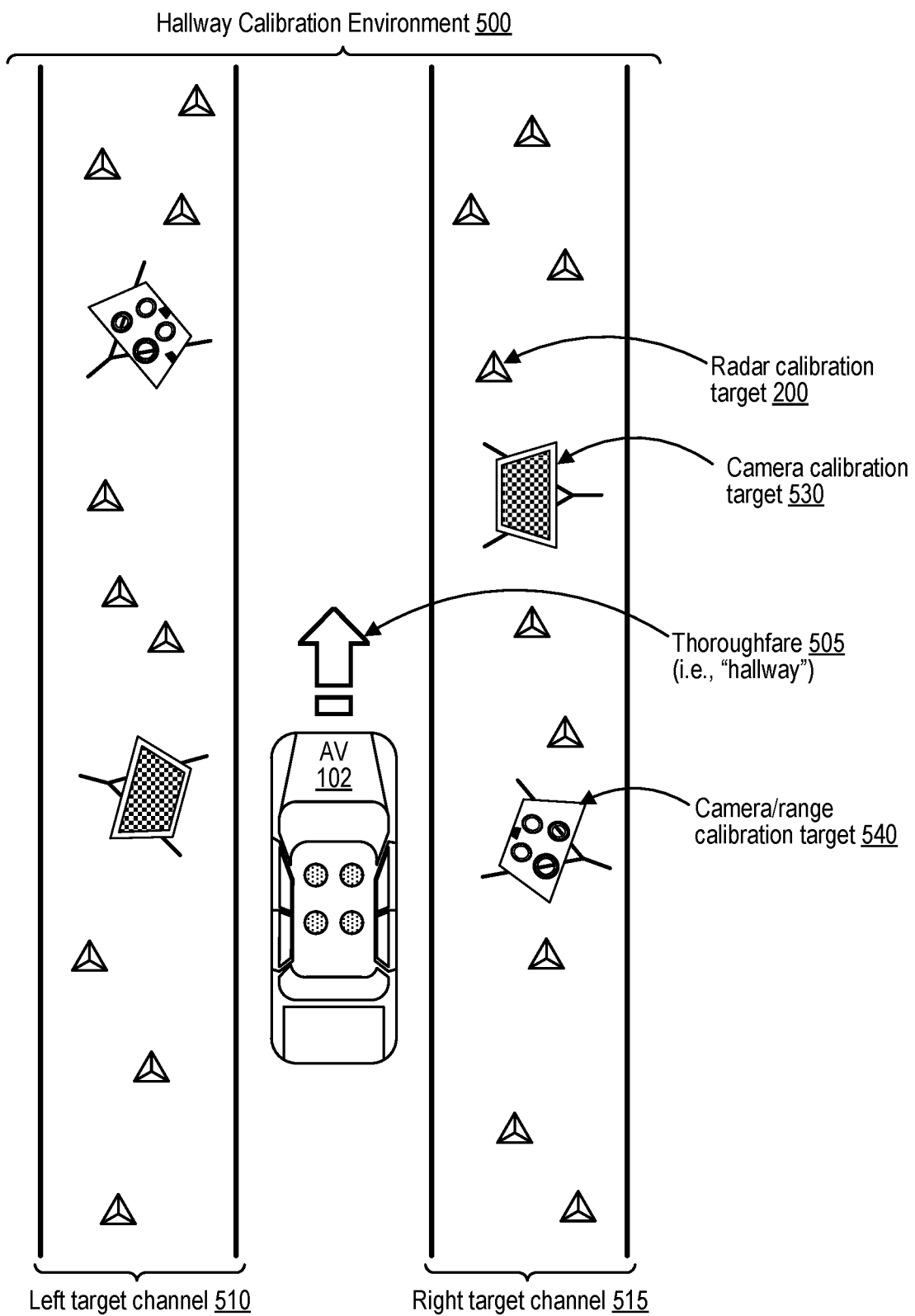

Captured Data 710 (dynamic scene)
(17013 dots; 107.79 dBsm range)

Corrected Data 720 (dynamic scene)
(17013 dots; 70.60 dBsm range)

Radar Cross Section (RCS) 730,
in decibels relative to a square meter (dBsm)

Radar Cross Section (RCS) 740,
in decibels relative to a square meter (dBsm)

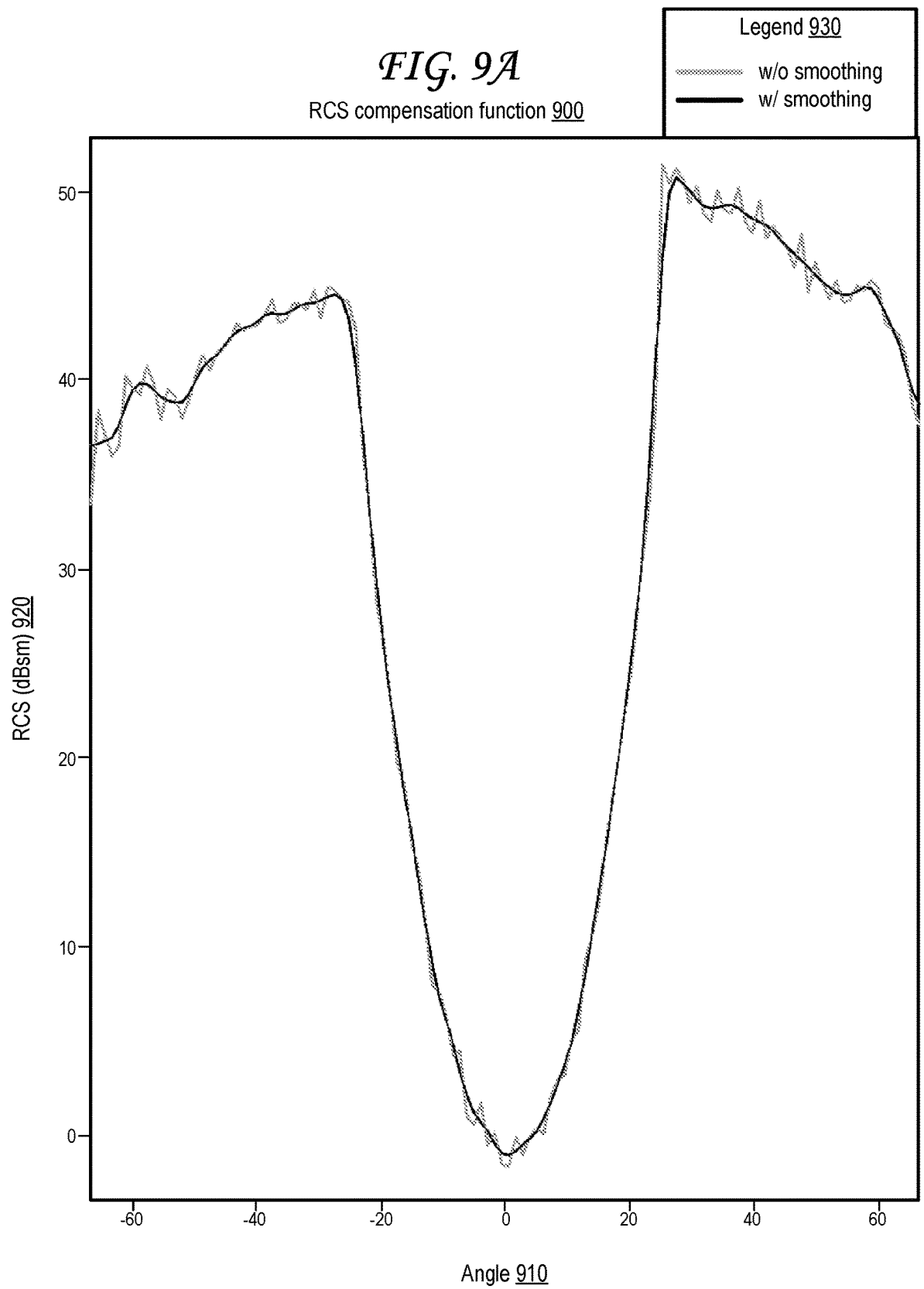

RCS compensation functions 950

Captured Data 1010 (static vehicle & targets)
(764 dots; 92.48 dBsm range)

Corrected Data 1020 (static vehicle & targets)
(764 dots; 65.56 dBsm range)

Radar Cross Section (RCS) 1030,
in decibels relative to a square meter (dBsm)

Radar Cross Section (RCS) 1040,
in decibels relative to a square meter (dBsm)

Captured Data 1110 (static vehicle & targets)
(min RCS threshold 1115 = 22 dBsm)

Corrected Data 1120 (static vehicle & targets)
(min RCS threshold 1115 = 22 dBsm)

Radar Cross Section (RCS) 1130,
in decibels relative to a square meter (dBsm)

Radar Cross Section (RCS) 1140,
in decibels relative to a square meter (dBsm)

Captured Data 1210 (dynamic scene)
(3329 dots; 76.32 dBsm range)

Corrected Data 1220 (dynamic scene)
(3329 dots; 37.66 dBsm range)

Radar Cross Section (RCS) 1230,
in decibels relative to a square meter (dBsm)

Radar Cross Section (RCS) 1240,
in decibels relative to a square meter (dBsm)

Captured Data 1310 (dynamic scene)
(min RCS threshold 1315 = 16 dBsm)

Corrected Data 1320 (dynamic scene)
(min RCS threshold 1315 = 16 dBsm)
(800 dots; 13.92 dBsm range)

Radar Cross Section (RCS) 1330,
in decibels relative to a square meter (dBsm)

Radar Cross Section (RCS) 1340,
in decibels relative to a square meter (dBsm)

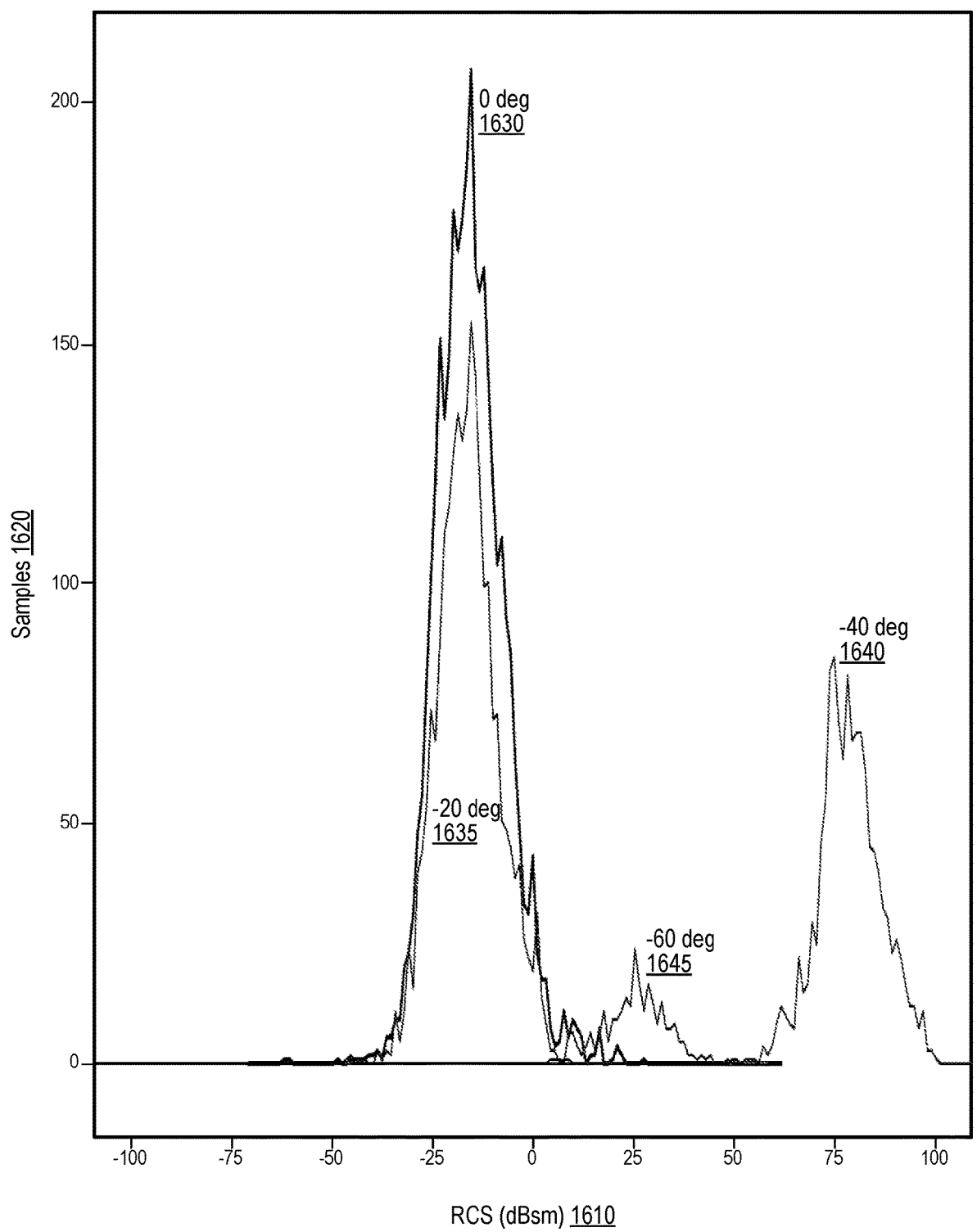

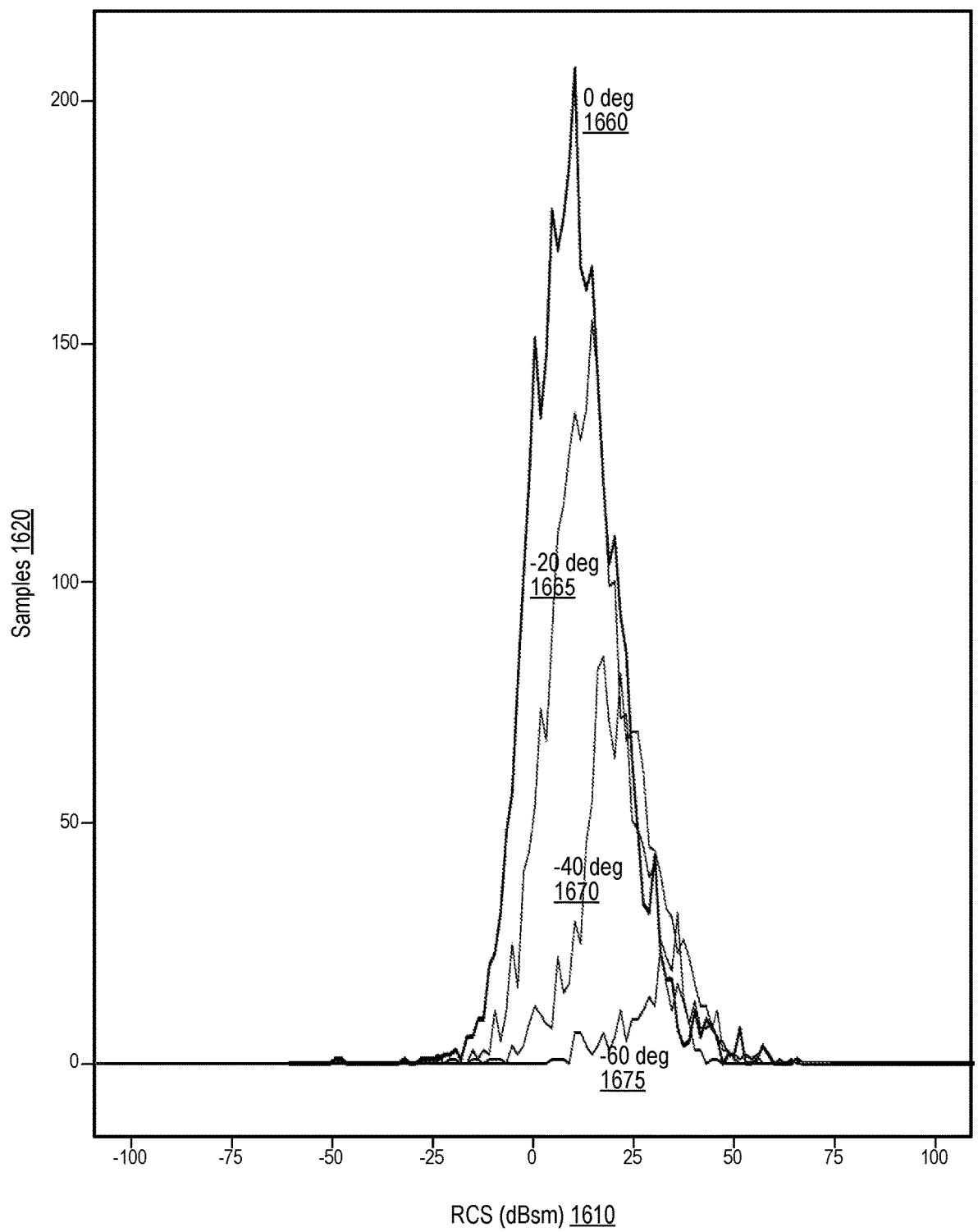

RADAR CROSS SECTION COMPENSATION FOR CALIBRATION OF VEHICLE RADAR

TECHNICAL FIELD

The present invention generally pertains to calibration of sensors that are used by vehicles. More specifically, the present invention pertains to calibration of radio detection and ranging (RADAR) sensors of a vehicle to compensate for positional discrepancies in radar cross section (RCS) measurements.

BACKGROUND

An autonomous vehicle is a motorized vehicle that can navigate without a human driver. An exemplary autonomous vehicle includes a plurality of sensor systems, such as, but not limited to, a camera sensor system, a light detection and ranging (LIDAR) sensor system, or a radio detection and ranging (RADAR) sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. Such sensors may also be mounted on other vehicles, such as vehicles that are used to generate or update street maps as they drive.

Some vehicles use multiple sensors of the same given type, such as multiple radar sensors, so that the vehicle has a larger field of view than a single such sensor would ordinarily provide. In such cases, the different sensors of the given type may each be slightly different. For example, one sensor of the given type may be made by a different manufacturer, or may be a different model or version, than another sensor of the given type. Additionally, one sensor of the given type may have a clear and unobstructed view of the environment around the vehicle, while another sensor of the given type may have a view that is at least partially occluded or weakened due to signals having to pass through a substrate such as a lens, or part of the body the vehicle. Furthermore, manufacturing defects or other discrepancies can exist in sensors, in vehicles, and/or in mounting hardware that affixes the sensors to the vehicles. Vehicle sensors of a given type can drift even further apart in their measurements due to exposure to the elements, for example through exposure to heat, rain, dust, frost, rocks, pollution, vehicular collisions, all of which can further impact a particular sensor's measurements, and which some sensors may be more susceptible to than others.

All of these differences between different sensors of a given type on a particular vehicle can lead to differences in sensor measurements across the vehicle's field of view that are not representative of reality. Because of this, the vehicle might not detect a pedestrian or another vehicle depending on where the pedestrian or other vehicle in the vehicle's field of view. Likewise, the vehicle might believe that it sees a pedestrian or other vehicle where none exist, due to over-emphasized noise. Because autonomous vehicles are trusted with human lives, it is imperative that autonomous vehicles have as robust an understanding of their environments as possible, otherwise a vehicle might perform an action that it should not perform, or fail to perform an action that it should perform, either of which can result in a vehicular accident and put human lives at risk. Other sensor-laden vehicles, such as those that collect data for maps or street-level imagery, can produce unreliable maps or images if they cannot account for the properties of their sensors, which can then in turn confuse both human vehicles and autonomous vehicles that rely on those maps, again risking human life.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 5 illustrates a top-down view of a hallway calibration environment in which a vehicle traverses a throughfare along which the vehicle is flanked by vehicle sensor calibration targets.

FIG. 9A illustrates a graph of a RCS compensation function both with and without smoothing.

FIG. 16A illustrates a distribution of RCS values at various FOV angles without fitting.

FIG. 16B illustrates the distribution of RCS values at various FOV angles of FIG. 16A with fitting.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

One or more radar sensors coupled to a vehicle receive readings during a calibration time period. Each radar sensor receives data covering a field of view of the sensor, which may be split into angle-based bins. A noise-reducing filter, such as a median filter, may be applied. A function is generated by processing raw radar cross section (RCS) returns into values plotted against angles compared to the direction that the sensor is facing. The function may be smoothed. Radar sensor measurements captured after calibration are corrected using the function, for example by automatically subtracting or dividing amounts corresponding to the function.

The disclosed technologies address a need in the art for improvements to vehicle sensor calibration technologies. Radar calibration using a radar cross section (RCS) compensation function improves the functioning of sensor calibration by improving radar sensor accuracy and reliability. The described vehicle sensor calibration technologies ultimately transform vehicle sensors from an uncalibrated state to a calibrated state. The described vehicle sensor calibration technologies are implemented using a vehicle, the vehicle's sensors, calibration targets in a calibration environment, optionally a turntable and other potential components of a dynamic scene calibration environment, and optionally one or more computing devices associated with the turntable and other components, each of which is integral at least one embodiment of the vehicle sensor calibration technologies.

Figure 1:
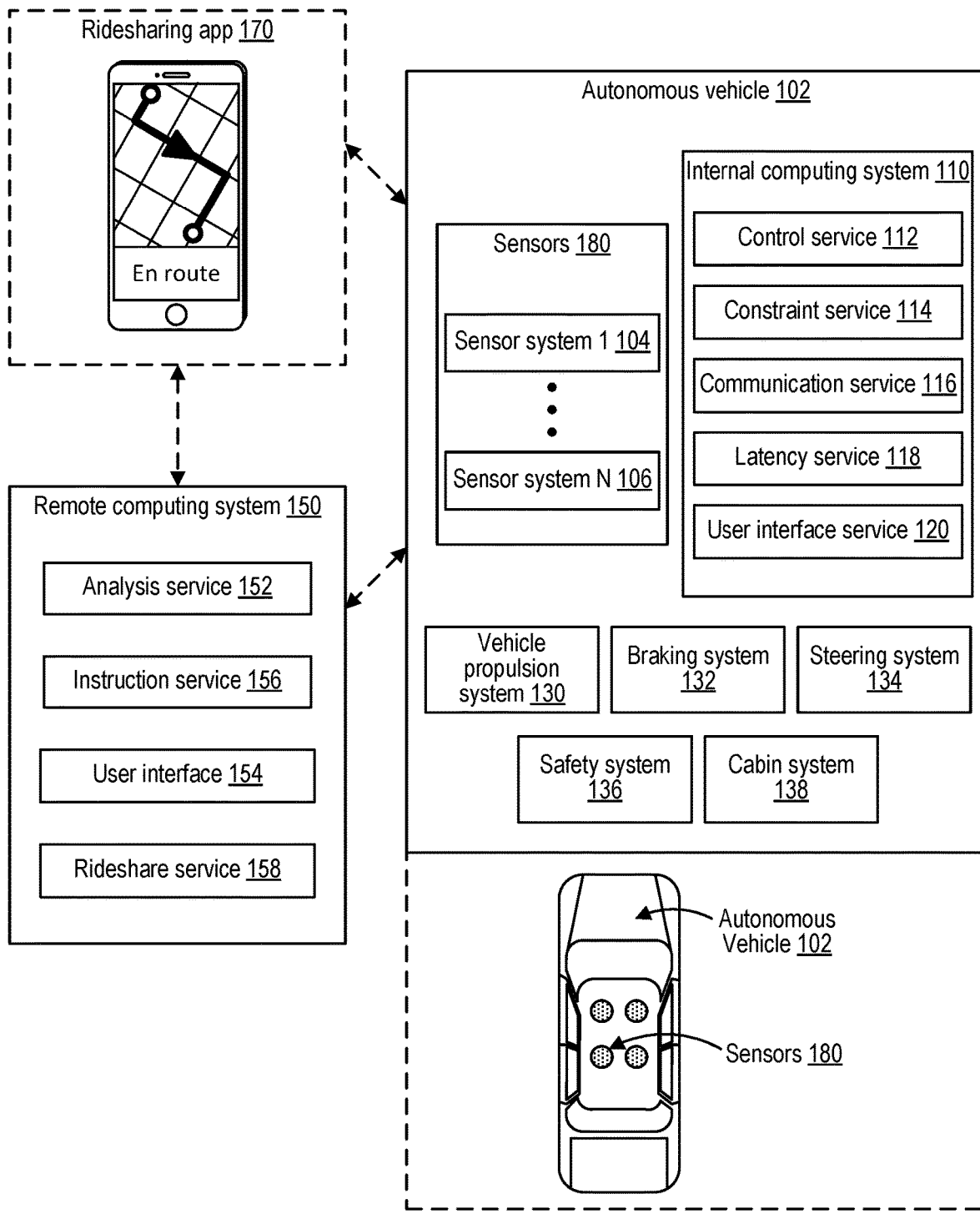
FIG. 1 illustrates an autonomous vehicle and remote computing system architecture.

FIG. 1 illustrates an autonomous vehicle and remote computing system architecture.

The autonomous vehicle 102 can navigate about roadways without a human driver based upon sensor signals output by sensor systems 180 of the autonomous vehicle 102. The autonomous vehicle 102 includes a plurality of sensor systems 180 (a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 208, the steering system 134, the safety system 136, and the cabin system 138. The control service 112 receives sensor signals from the sensor systems 180 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

Figure 15:
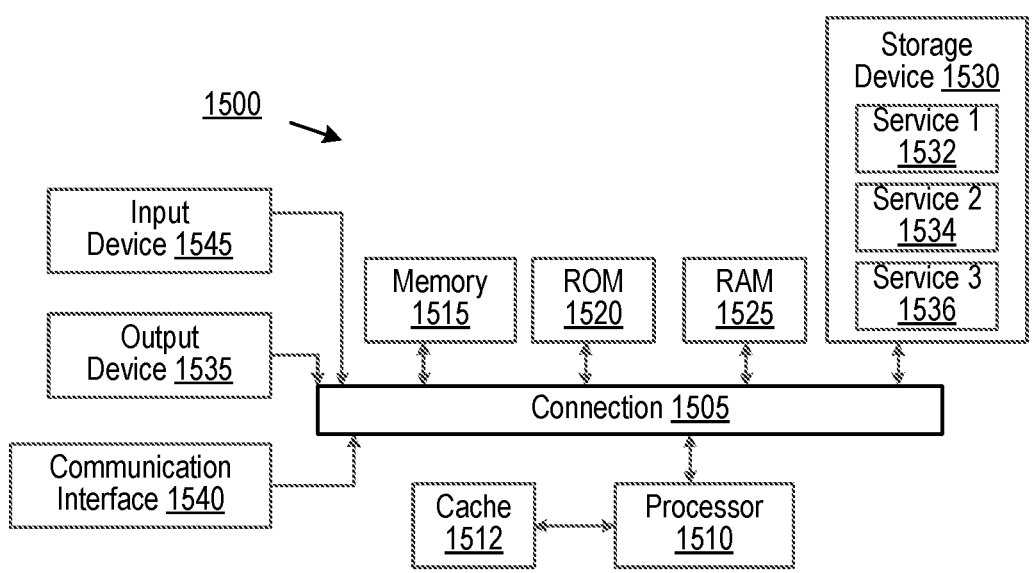
FIG. 15 shows an example of a system for implementing certain aspects of the present technology.

The internal computing system 110 can, in some cases, include at least one computing system 1500 as illustrated in or discussed with respect to FIG. 15, or may include at least a subset of the components illustrated in FIG. 15 or discussed with respect to computing system 1500.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

The remote computing system 150 can, in some cases, include at least one computing system 1500 as illustrated in or discussed with respect to FIG. 15, or may include at least a subset of the components illustrated in FIG. 15 or discussed with respect to computing system 1500.

Figure 2:
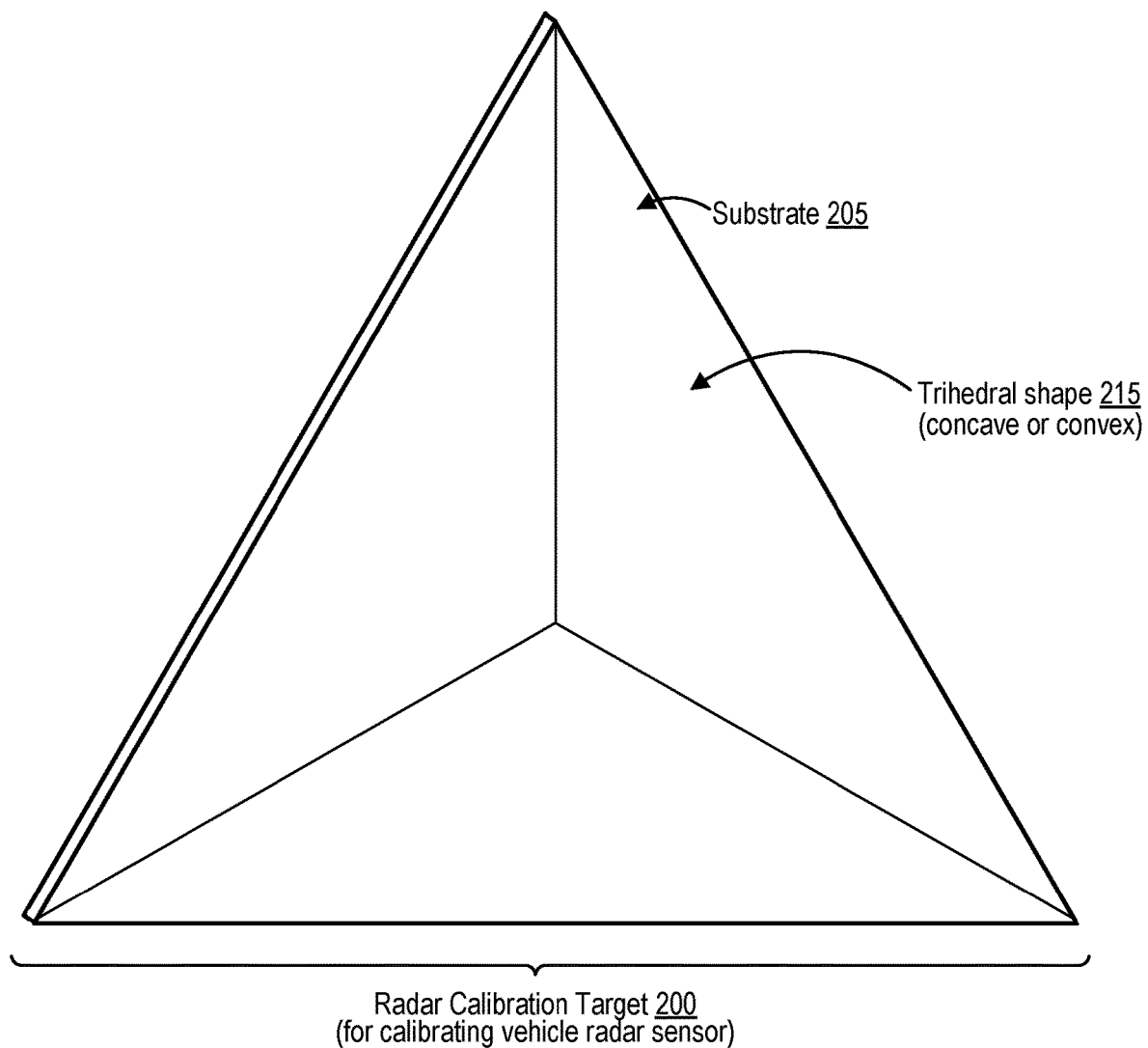
FIG. 2 illustrates a radar sensor calibration target with a trihedral shape.

FIG. 2 illustrates a radar sensor calibration target with a trihedral shape.

The sensor calibration target 200 of FIG. 2 a target that is made to be easily detected by, and used for calibration of, a range sensor, such as a radar sensor (or in some cases a LIDAR, SONAR, and/or SODAR sensor) of the vehicle 102. In particular, the sensor calibration target 200 of FIG. 2 has a trihedral shape 215, and may be a concave or convex trihedral corner, essentially a triangular corner of a cube. Alternately, it may be a different shape, such as a corner of a different polyhedron (at least portions of all faces of the polyhedron that touch a particular vertex). Such a shape, especially when concave and where perpendicular faces are included, produces a particularly strong radar echo and thus a particularly strong radar cross section (RCS) because incoming radio waves are backscattered by multiple reflection. The RCS of the trihedral corner target is, in some cases, given by: $\sigma=(4\cdot\pi\cdot a4)/(3\cdot\lambda 2)$, where a is the length of the side edges of the three triangles, and $\lambda$ is a wavelength of radar transmitter.

The sensor calibration target 200 of FIG. 2 may be made of, include, or be coated with a substrate material 205. The substrate material 205 may in some cases be made of, or include, any material, such as paper, cardboard, wood, plastic, metal, foam, or some combination thereof. The substrate 205 may in some cases include a translucent or transparent surface. The substrate 205 may in some cases include a retroreflective surface, which may be metallic. The retroreflective property of the surface may be inherent to the material of the substrate 205 or may be a separate layer applied to the surface of the substrate, for example by adhering a retroreflective material to the substrate 205 or by painting (e.g., via a brush, roller, or aerosol spray) the substrate 205 with a retroreflective paint. A reflective or retroreflective property may in some cases improve detection using radar, lidar, or other EmDAR sensors. The material and shape of the substrate 205 may also be selected such that the material and/or shape produces a high amount of acoustic resonance or acoustic response to improve detection using SONAR or SODAR sensors. In some cases, the substrate 205, and therefore the target 200, may be concave, convex, otherwise curved, or some combination thereof. In one embodiment, the substrate 205 of the sensor calibration target 200 may be metal and/or electrically conductive. The substrate 205 may in some cases include devices, such as speakers, heat sources, or light sources, that allow improved detection by microphones, infrared sensors, or cameras, respectively.

Figure 3:
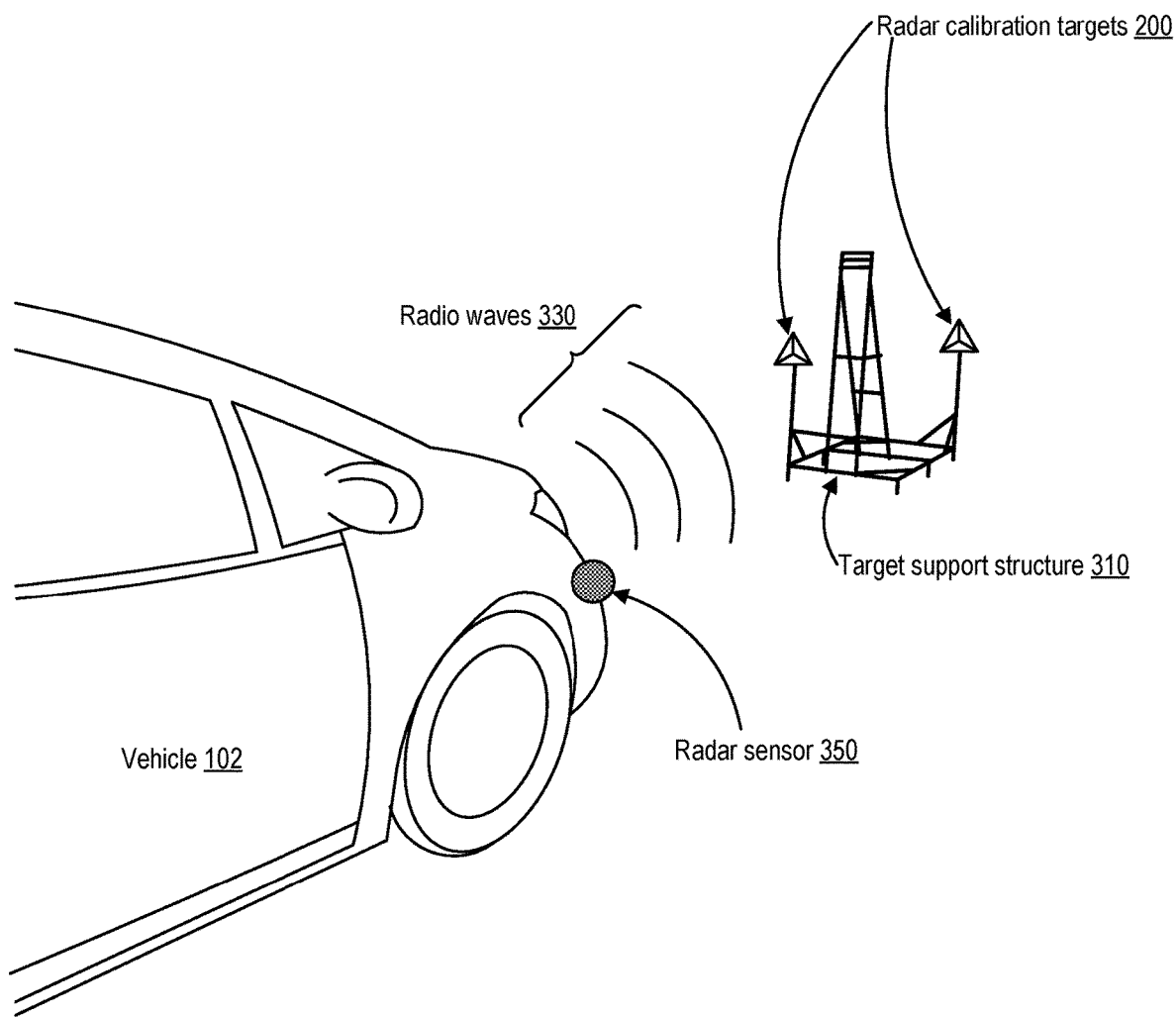
FIG. 3 illustrates a perspective view of a vehicle using one or more radar sensors to detect two radar sensor calibration targets set up in a calibration environment.

FIG. 3 illustrates a perspective view of a vehicle using one or more radar sensors to detect two radar sensor calibration targets set up in a calibration environment.

The calibration environment in FIG. 3 is illustrated with two radar calibration targets 200 affixed/coupled to a target support structure 310. The target support structure 310 used in FIG. 3 may be made of, or include, any material, such as paper, cardboard, plastic, metal, foam, any material discussed with respect to the substrate 205, or some combination thereof. In some cases, certain stands may be at least partially made of, or include, a plastic such polyvinyl chloride (PVC) to avoid detection by certain types of range sensors, such as radar sensors, which detect metal better than they detect plastic.

The sensors 180 of the vehicle 102 of FIG. 3 include one or more radar sensors 350, which include one or more radio transmitters and one or more radio receivers, and/or one or more radio transceivers. The radio transmitter(s) or transceiver(s) of the radar sensor(s) 350 of the vehicle 102 emit one or more radio waves 330, whose reflections/backscatter (not pictured) are received by the radio receiver(s) or transceiver(s) of the radar sensor(s) 350 of the vehicle 102. Based on receipt of the reflections by the radio receiver(s) or transceiver(s), the radar sensor(s) 350 and/or the internal computer 110 coupled thereto detect the presence of the targets 200 by detecting radar cross section (RCS), a measure of the ratio of backscatter density in the direction of the radar (from the target) to the power density that is intercepted by the target.

Figure 4A:
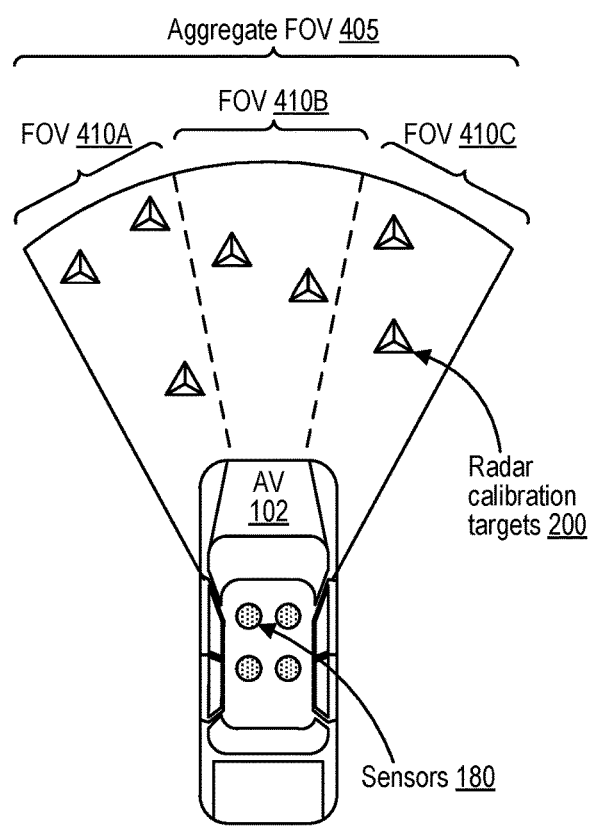
FIG. 4A illustrates a top-down view of a vehicle using multiple radar sensors to detect seven radar sensor calibration targets in an aggregate field of view of the multiple radar sensors.

FIG. 4A illustrates a top-down view of a vehicle using multiple radar sensors to detect seven radar sensor calibration targets in an aggregate field of view of the multiple radar sensors.

The sensors 180 of the vehicle 102 of FIG. 4A include three radar sensors (or other range sensors), each with its own field of view (FOV) 410. Data from fields of view (FOV) 410, when accumulated together as discussed further in in FIG. 4B, form an aggregate field of view (FOV) 405, which may also be referred to as the collective FOV 405. Note that in some cases, the terms field of view (FOV) and point of view (POV) may be used interchangeably. That is, the FOV 410 of a sensor as discussed herein may in some cases be referred to as a POV of that sensor. The aggregate FOV 405 of all of the vehicle 102's radar sensors may in some cases be referred to as the aggregate POV of the vehicle 102's radar sensors.

The aggregate field of view 405 is represented in FIG. 4A as a portion of a circle corresponding to a particular angular range, the angles in the angular range ranging from an angle to the left of the direction the vehicle is facing to an angle to the right of the direction the vehicle is facing. The portion of the circle corresponding to the angular range may be, for example, approximately half of a semicircle, or ¼ of a circle, with the axis of symmetry being the direction the vehicle is facing. Depending on the number and type of sensors 180 the vehicle 102 has, the angular range corresponding to the aggregate FOV 405 may correspond to a full circle or semicircle, or a fraction of a circle or semicircle, such as ⅛, ¼, ⅜, ½, ⅝, ¾, ⅞ of either a circle or semicircle. Each FOV 410 of each sensor may likewise be a circle, semicircle, or any of the fractions of a circle or semicircle discussed above with respect to the FOV 405 of each.

The aggregate field of view (FOV) 405 of FIG. 4A is comprised of a first field of view (FOV) 410A from a first radar sensor of the sensors 180 of the vehicle 102, a second field of view (FOV) 410B from a second radar sensor of the sensors 180 of the vehicle 102, and a third field of view (FOV) 410C from a third radar sensor of the sensors 180 of the vehicle 102. While the boundaries of the three fields of view 410A, 410B, and 410C that each correspond to a sensor 180 are indicated with dashed lines in FIG. 4A, in some cases two or more different fields of view 410 corresponding to the different sensors may overlap, in which case certain angular ranges relative to the direction of the vehicle are covered by more than one overlapping field of view, or in other words, may be viewed by more than one radar sensor. In some cases, a "gap" or "blind spot" may exist between two or more different fields of view 410 because no sensor viewed the angles in that gap and therefore no sensor had the angles/regions in that gap in its corresponding FOV 410, which may cause certain angular ranges corresponding to those gaps or blind spots to be missing from the aggregate field of view (FOV) 405.

Note that while the sensors 180 of the vehicle 102 of FIG. 4A are illustrated as uniform and as mounted or otherwise coupled to the roof of the vehicle 102, different types of sensors 180 may be used, and different sensors 180 may be positioned along, or coupled to, different portions of the vehicle 102. In one embodiment, the left-side radar sensor corresponding to the first FOV 410A and the right-side radar sensor corresponding to the third FOV 410C may be coupled to the left and right side/wing/door/fender mirrors of the vehicle 102, respectively, while the center radar sensor corresponding to the second FOV 410B may be coupled to or hidden behind a front bumper of the vehicle 102. Some sensors 180 may be located along or coupled to the interior of the vehicle, for example behind the windshield or to the interior rear-view mirror. The vehicle 102 may have sensors located along the roof, doors, walls, windows, bumpers, anywhere along the top and/or bottom and/or front and/or left side and/or right side and/or rear of the vehicle, or any combination thereof.

Furthermore, different sensors of a given type, such as of a radar sensor type, may each be slightly different. For example, one sensor of the given type may be made by a different manufacturer, or may be a different model or version, than another sensor of the given type. One sensor may run (and/or interact with one or more a computing systems 1500 running) a different firmware, operating system (OS), basic input/output system (BIOS), software, or some combination thereof compared to another sensor. Additionally, one sensor of the given type may have a clear and unobstructed field of view 410 of the environment around the vehicle, while another sensor of the given type may have a field of view 410 that is at least partially occluded or weakened due to signals having to pass through a substrate such as a lens, or part of the body the vehicle 102 such as a windshield, a window, a sunroof, a moonroof, a bumper, a portion of the frame of the vehicle, a wheel, a tire, a seat, a roof, a roof rack, a rack on a side or back or front of the vehicle 102, another component of the vehicle 102, another object mounted or otherwise coupled to the vehicle 102, or some combination thereof. Furthermore, manufacturing defects or other discrepancies can exist in sensors, in vehicles, and/or in mounting hardware that affixes the sensors to the vehicles, which can cause differences between otherwise identical sensors. Vehicle sensors of a given type can drift even further apart in their measurements due to exposure to the elements, for example through exposure to heat, rain, dust, frost, rocks, pollution, vehicular collisions, all of which can further impact a particular sensor's measurements even with all else being equal. Some sensors may be more susceptible to, or may be more shielded from, or may react differently to, such environmental or accident-caused effects than others, meaning that sensors subjected to the same conditions will not necessarily be affected in the same way or to the same degree.

Of the seven radar sensor targets 200 in aggregate FOV 405 as illustrated in FIG. 4A, three are in FOV 410A, two are in FOV 410B, and two are in FOV 410C.

Figure 4B:
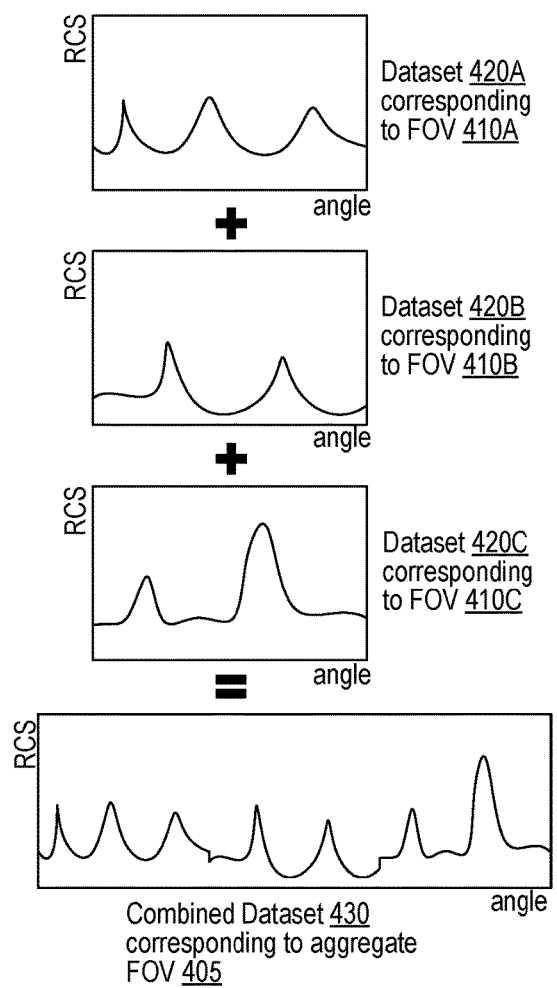
FIG. 4B illustrates combining radar data corresponding to a field of view of each radar sensor of the vehicle into a single dataset with radar data corresponding to the aggregate field of view of the multiple radar sensors of FIG. 4A.

FIG. 4B illustrates combining radar data corresponding to a field of view of each radar sensor of the vehicle into a single dataset with radar data corresponding to the aggregate field of view of the multiple radar sensors of FIG. 4A.

Specifically, FIG. 4B illustrates three datasets 420 corresponding to the three points of view 410, each dataset plotting RCS on the Y axis and angle on the X-axis. The first dataset 420A corresponds to RCS measurements from the first FOV 410A, with the three peaks visible in the first dataset 420A as illustrated in FIG. 4B corresponding to the three targets 200 located in the first FOV 410A as illustrated in FIG. 4A. The second dataset 420B corresponds to RCS measurements from the second FOV 410B, with the two peaks visible in the second dataset 420B as illustrated in FIG. 4B corresponding to the two targets 200 located in the second FOV 410B as illustrated in FIG. 4A. The third dataset 420C corresponds to RCS measurements from the third FOV 410C, with the two peaks visible in the third dataset 420C as illustrated in FIG. 4B corresponding to the two targets 200 located in the third FOV 410C as illustrated in FIG. 4A.

By appending the second dataset 420B to the right of the first dataset 420A, and the third dataset 420C to the right of the second data 420B, a combined dataset 430 corresponding to RCS measurements over the angular range of the entire aggregate FOV 405 is produced. The seven peaks in the combined dataset 430 as illustrated in FIG. 4B correspond to the seven targets 200 located in the aggregate FOV 405.

In cases where sensors include overlapping FOVs 410, the RCS data corresponding to those regions that goes into the aggregate FOV 405 may be a mean of the data from the overlapping FOVs 410, a median of the data from the overlapping FOVs 410, a mode of the data from the overlapping FOVs 410, a maximum of the data from the overlapping FOVs 410, a minimum of the data from the overlapping FOVs 410, a selected subset of the data from the overlapping FOVs 410 (e.g., randomly selected), data from a selected one of the overlapping FOVs 410 (e.g., randomly selected), or some combination thereof.

Figure 8:
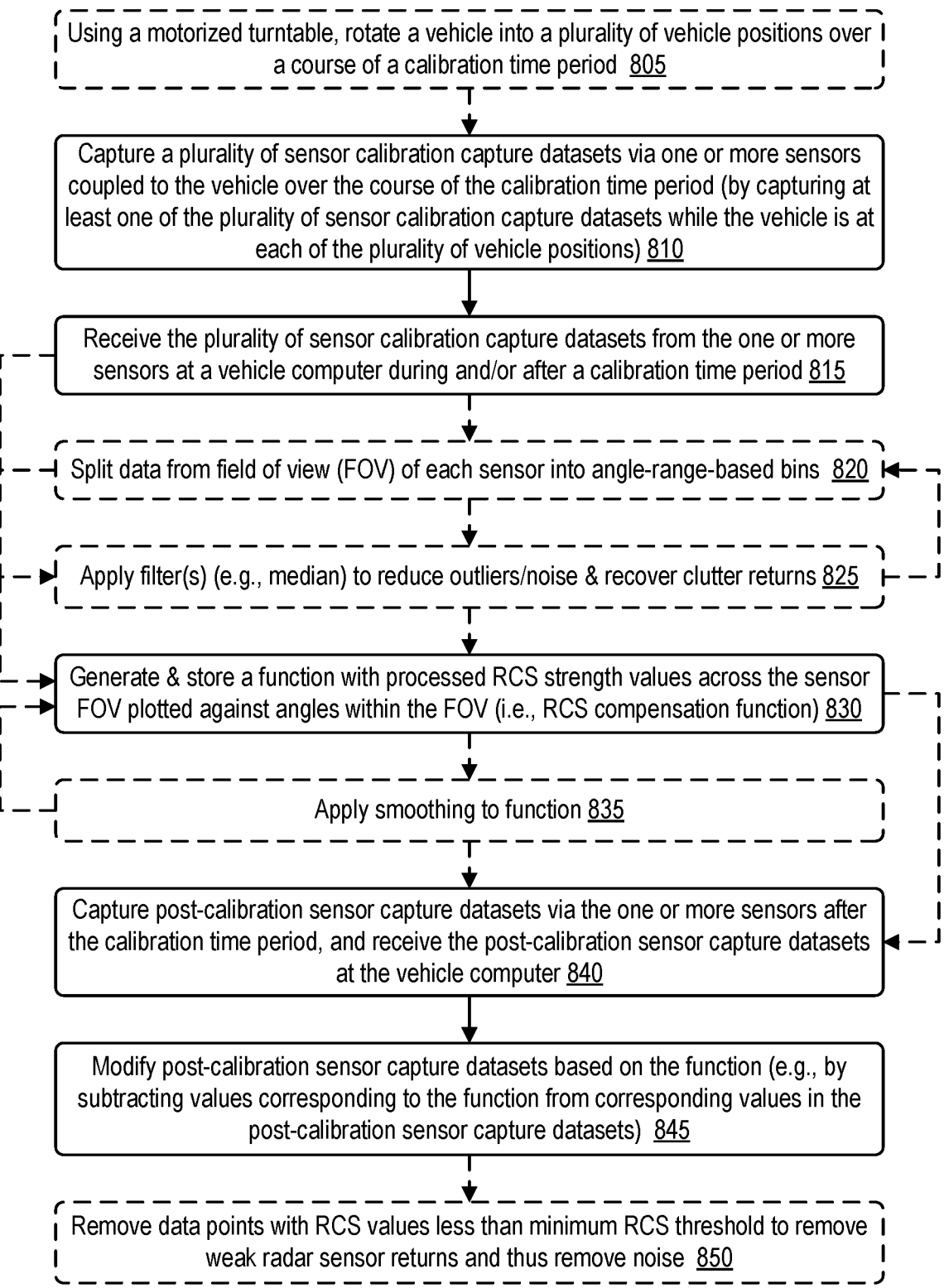
FIG. 8 is a flow diagram identifying operations for calibrating one or more radar sensors of a vehicle using RCS compensation.
Figure 14:
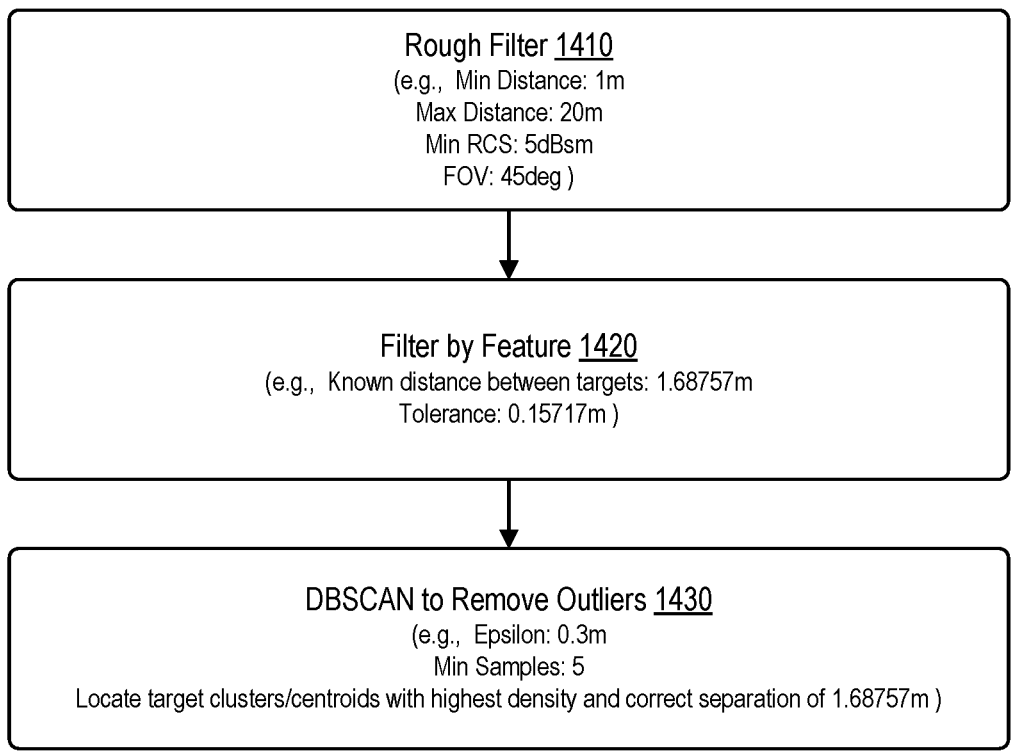
FIG. 14 is a flow diagram illustrating operations for detecting targets in a RCS point cloud that may be performed instead of, or in addition to, RCS compensation.

The datasets 420A, 420B, and 420C of FIG. 4B may be data that was just measured by the radar sensor(s) of the vehicle 102, or it may be data that has already undergone some processing, such as the binning, filtering, and/or RCS compensation discussed with respect to FIG. 8; and/or the rough filtering, filtering by feature, and/or machine learning clustering discussed with respect to FIG. 14; and/or combination thereof.

FIG. 5 illustrates a top-down view of a hallway calibration environment in which a vehicle traverses a throughfare along which the vehicle is flanked by vehicle sensor calibration targets.

The hallway calibration environment 500, which may also be referred to as a tunnel calibration environment, includes a thoroughfare 505 through which a vehicle 102 drives, the thoroughfare 505 flanked on either side by targets detectable by the sensors 180 of the vehicle 102. The thoroughfare 505 may also be referred to as the drive path, the drive channel, the hallway, or the tunnel. Some of the targets are arranged in a left target channel 510 that is to the left of the vehicle 102 as the vehicle 102 traverses the thoroughfare 505. Others of the targets are arranged in a right target channel 515 that is to the right of the vehicle 102 as the vehicle 102 traverses the thoroughfare 505.

In FIG. 5, the targets in the left target channel 510 and right target channel 515 include radar calibration targets 200 as illustrated in and discussed with respect to FIG. 2, but also include other types of targets, such as camera calibration targets 530 and combined camera/range calibration targets 540.

The camera calibration targets 530 include patterns such as checkerboards, ArUco patterns, quick response (QR) code patterns, barcode patterns, or crosshair patterns, printed onto planar substrates, and may be used to calibrate cameras among the vehicle 102's sensors 180, for example by identifying how a camera lens is warped based on identifying how a grid corresponding to a checkerboard, ArUco pattern, or QR code pattern is warped in the resulting image of such a camera calibration target 530.

The combined camera/range calibration targets 540 include four circular cutouts from a substrate, one cutout smaller than the other three cutouts, each cutout surrounded by a high-contrast (e.g., black on a white substrate or vice versa) circular ring visual marking. The combined camera/range calibration targets 540 may also include target identifier markings, illustrated in FIG. 5 as black squares centered along on one or more sides of the substrate of the target, which may serve to identify one target from another. The vehicle 102 can detect the combined camera/range extrinsic calibration targets 540 using both its range sensors (e.g., LIDAR or any other range sensor discussed herein) and using its cameras by detecting the circular cutouts with the range sensors and the rings/markings around the cutouts and the target identifier markings with the cameras. In doing so, the vehicle 102 and its computer 110 can detect a center of the circular cutout easily, since range sensors such as lidar typically provide a point cloud of depth measurements that can help identify where the narrowest and widest parts of each circle are. The visually marked circular rings detected by the camera have the same centers as the circular cutouts do, so the center of each circular cutout as determined based on range sensor data is the same as the center of each visually marked circular ring. The range sensor and camera know they are looking at the exact same locations for each of these center points. Thus, the camera and range sensor may be extrinsically calibrated so that their positional awareness of the surroundings of the vehicle 102 can be positionally aligned. The extrinsic calibration may, in some cases, output one or more matrices used for transforming a camera location to a range sensor location or vice versa, via translation, rotation, or other transformations in 3D space. The targets 530 and 540 illustrated in FIG. 5 are illustrated as each mounted on separate easel-style stands. Other types of stands are also possible, such as the target support structure 310 illustrated in FIG. 3 or the stands 610 illustrated in FIG. 6.

The targets 530 and/or 540 may be made using any substrate, such as paper, cardboard, plastic, metal, foam, or some combination thereof. The substrate may in some cases include a translucent or transparent surface. The substrate may in some cases include a retroreflective surface. The retroreflective property of the surface may be inherent to the material of the substrate or may be a separate layer applied to the surface of the substrate, for example by adhering a retroreflective material to the substrate or by painting (e.g., via a brush, roller, or aerosol spray) the substrate with a retroreflective paint. A reflective or retroreflective property may in some cases improve detection using radar, lidar, or other EmDAR sensors. The material and shape of the substrate may also be selected such that the material and/or shape produces a high amount of acoustic resonance or acoustic response to improve detection using SONAR or SODAR sensors. In some cases, the substrate, and therefore the target 530/540, may be concave, convex, otherwise curved, or some combination thereof. In one embodiment, the substrate of the sensor calibration target 530/540 may be metal and/or electrically conductive. The substrate may in some cases include devices, such as speakers, heat sources, or light sources, that allow improved detection by microphones, infrared sensors, or cameras, respectively.

Positioning of radar calibration targets 200 in clusters may similarly help intrinsically calibrate the radar sensors of the vehicle, and known positioning of the radar calibration targets 200 in the calibration environment relative to other targets (such as the camera calibration targets 530 and/or the combined camera/range calibration targets 540) may help extrinsically calibrate the radar sensors of the vehicle with respect to other sensors of the vehicle, such as camera and/or LIDAR.

The vehicle 102 drives along the thoroughfare 505 in the hallway calibration environment 500, optionally stopping after incremental distance or time amounts, for example, every foot, every $N_1$ feet, every meter, every $N_1$ meters, every second, or every $N_1$ seconds, where $N_1$ is a number greater than zero, such as 1, 2, 5, 4, 5, 6, 7, 8, 9, or 10. At each stop, the vehicle 102 captures data using each of its vehicle sensors, or at least each of the vehicle sensors that it intends to calibrate. The vehicle 102 stopping helps prevent issues caused by sensors running while the vehicle 102 is in motion, such as motion blur or rolling shutter issues in cameras. The vehicle 102 stopping also ensures that sensors can capture data while the vehicle 102 is in the same position, which may be important for extrinsic calibration of two or more sensors with respect to each other so that a location within data gathered by a first vehicle sensor (e.g., a range sensor such as a LIDAR or radar sensor) can be understood to correspond to a location within data gathered by a second vehicle sensor (e.g., a camera). The vehicle 102 may in some cases traverse the thoroughfare 505 multiple times, for example $N_2$ times in each direction, where $N_2$ is, for example, 1, 2, 3, 4, 5, 6, 7, 8, 9, 10, 11, 12, 13, 14, 15, 16, 17, 18, 19, or 20.

In other cases, the vehicle 102 may drive along the thoroughfare 505 in the hallway calibration environment 500 continuously without stopping, and the vehicle 102 can capture data with its sensors 180 continuously, or at various distance or time intervals without the vehicle 102 ever stopping. In some cases, a combination of these hallway calibration environment 500 sensor data gathering operations may be used, so that some sensor data is gathered from the sensors 180 of the vehicle 102 while the vehicle is stopped at defined distance or time intervals, and other sensor data is gathered from the sensors 180 of the vehicle 102 while the vehicle 102 is moving (optionally before, after, or in between stops). These data corresponding to the stopped vehicle 102 and corresponding to the moving vehicle 102 may then be considered either together or separately.

The sensor targets illustrated in FIG. 5 are illustrated such that some are positioned closer to the thoroughfare 505 while some are positioned farther from the thoroughfare 505. Additionally, while some targets in FIG. 5 are facing a direction perpendicular to the thoroughfare 505, others are angled up or down with respect to the direction perpendicular to the thoroughfare 505. While the sensor targets illustrated in FIG. 5 all appear to be at the same height and all appear to not be rotated about an axis extending out from the surface of the target, it should be understood that the sensor targets may be positioned at different heights and may be rotated about an axis extending out from the surface of the target as in the targets of FIG. 6. Together, the distance from the thoroughfare 505, the direction faced relative to the thoroughfare 505, the clustering of targets, the height, and the rotation about an axis extending out from the surface of the target may all be varied and modified to provide better intrinsic and extrinsic calibration. That is, these variations assist in intrinsic calibration in that collection of data with representations of targets in various positions, rotations, and so forth ensures that targets are recognized as they should be by any sensor, even in unusual positions and rotations, and that any necessary corrections be performed to data captured by sensors after calibration. These variations assist in extrinsic calibration in that the different positions and rotations and so forth provide more interesting targets for range sensors, such as lidar, radar, sonar, or sodar, and allow range sensors to aid in interpretation of optical data collected by a camera of the vehicle 102.

While the thoroughfare 505 of the hallway calibration environment 500 of FIG. 5 is a straight path, in some cases it may be a curved path, and by extension the left target channel 510 and right target channel 515 may be curved to follow the path of the thoroughfare 505.

While the hallway calibration environment 500 is effective in providing an environment with which to calibrate the sensors 180 of the vehicle 102, it is inefficient in some ways. The hallway calibration environment 500 is not space efficient, as it occupies a lot of space. Such a hallway calibration environment 500 is best set up indoors so that lighting can be better controlled, so the hallway calibration environment 500 requires a large indoor space, and by extension, a lot of light sources, which is not energy-efficient or cost-efficient. Because of how much space the hallway calibration environment 500 takes up, it is more likely to have to be taken down and set back up again, affecting consistency of calibration between different vehicles whose sensors are calibrated at different times. Further, because the setup of the hallway calibration environment 500 requires the vehicle 102 to drive through it, different vehicles 102 might be aligned slightly differently in the thoroughfare 102, and might drive a slightly different path through the thoroughfare 102, and might stop at slightly different spots and/or frequencies along the drive, due to manufacturing differences in the vehicle 102 and due to human error in setting the vehicle 102 up, all of which affects consistency of the calibration. Trying to correct for all of these potential inconsistencies, and turning the vehicle around to move it through the hallway calibration environment 500 multiple times, is time and labor intensive, making the hallway calibration environment 500 time-inefficient. Additionally, because the targets are primarily to the left and right sides of the vehicle 102 hallway calibration environment 500, vehicle sensors might not be as well calibrated in the regions to the front and rear of the vehicle. Using a thoroughfare 505 with some turns can help alleviate this, but again causes the hallway calibration environment 500 to take up more space, increasing space-inefficiency.

Figure 6:
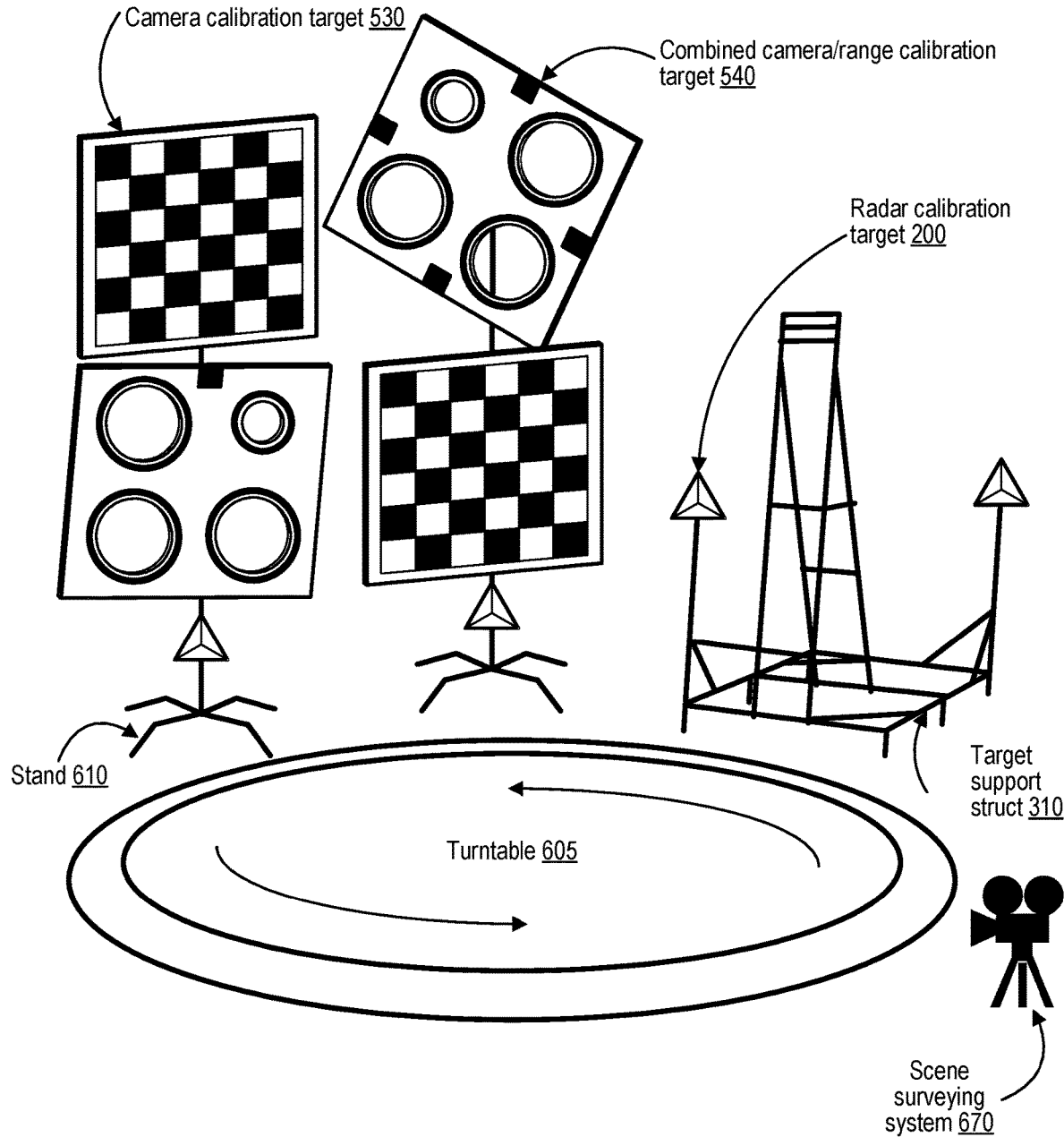
FIG. 6 illustrates a perspective view of a dynamic scene calibration environment in which a turntable that is at least partially surrounded by vehicle camera calibration targets rotates a vehicle so that the vehicle can perform calibration of its sensors.

FIG. 6 illustrates a perspective view of a dynamic scene calibration environment in which a turntable that is at least partially surrounded by vehicle camera calibration targets rotates a vehicle so that the vehicle can perform calibration of its sensors The dynamic scene calibration environment 600 of FIG. 6 includes a motorized turntable 605. A vehicle 102 drives onto the turntable 605, and the motors actuate to rotate the turntable 605 and thereby rotate the vehicle 102. While the arrows on the turntable 605 show a counter-clockwise rotation, it should be understood that the motorized turntable 605 can be actuated to rotate clockwise as well.

In some cases, the motorized turntable 605 may be rotated by predetermined rotation or time intervals (measured in degrees/radians or an amount at a time), for example intervals of $N_3$ degrees or $N_3$ seconds, in between which the turntable optionally stops. During those stops, the vehicle 102 can capture data with its sensors 180. $N_3$ may be, for example, 1, 2, 3, 4, 5, 6, 7, 8, 9, 10, 11, 12, 13, 14, 15, 16, 17, 18, 19, or 20. In other cases, the motorized turntable 605 may be rotated continuously without stopping, and the vehicle 102 can capture data with its sensors 180 continuously, or at various rotation or time intervals without the turntable ever stopping. In some cases, a combination of these turntable sensor data gathering operations may be used, so that some sensor data is gathered from the sensors 180 of the vehicle 102 while the vehicle is stopped at defined rotation or time intervals, and other sensor data is gathered from the sensors 180 of the vehicle 102 while the motorized turntable 605 and the vehicle 102 on it are rotating (optionally before, after, or in between stops). These data corresponding to the stopped vehicle 102 and corresponding to the moving vehicle 102 may then be considered either together or separately.

The motorized turntable 605 can optionally start and stop at the defined intervals, and eventually performs a full 360 degree rotation in this manner. The motorized turntable 605 may, in some cases, perform multiple full rotations in one or both rotation directions (clockwise and/or counterclockwise), for example $N_4$ rotations in each rotation direction, where $N_4$ is, for example, 1, 2, 3, 4, 5, 6, 7, 8, 9, 10, 11, 12, 13, 14, 15, 16, 17, 18, 19, or 20. In other embodiments, the targets around the motorized turntable may include any other type of target discussed herein that is used to calibrate any vehicle sensor or combination of vehicle sensors, including but not limited to the radar calibration target 200 of FIG. 2, the camera calibration target 530 of FIG. 5 and FIG. 6, and the combined calibration target 540 of FIG. 5 and FIG. 6, and additionally may include targets with heating elements detectable by infrared sensors of the vehicle 102, targets with speakers detectable by microphones of the vehicle 102, targets with reflective acoustic properties detectable by SONAR/SODAR/ultrasonic/infrasonic sensors of the vehicle 102, or some combination thereof.

The turntable 605 is at least partially surrounded by radar calibration targets 200, camera calibration targets 530, and combined camera/range calibration targets 540 mounted on stands 610 or on a target support structure 310. As in FIG. 3, the target support structure 310 includes two radar calibration targets 200. Each stand 610 includes one or more camera targets 530 and/or one or more combined camera/range targets 540, and/or one or more radar calibration targets 200. In some cases, the targets on the stand 610 may be a known distance from each other along the stand 610, permitting extrinsic calibration between the radar that detects these radar targets 200 and the camera and/or lidar (or other range sensor) that detects the targets 530 and/or 540.

The target support structure 310 and/or the stands 610 used in FIGS. 3, 5, and 6 may include any material, such as paper, cardboard, plastic, metal, foam, or some combination thereof. In some cases, certain stands 610 may be made of a plastic such polyvinyl chloride (PVC) to avoid detection by certain types of range sensors, such as radar, which detect metal better than plastic.

The dynamic scene calibration environment 600 of FIG. 6 also includes a scene surveying system 670, which may include one or more cameras, one or more range sensors (e.g., radar, lidar, sonar, sodar, laser rangefinder). This may take the form of a robotic total station (RTS). While the vehicle 102, its sensors 180, and the targets are enough to perform intrinsic calibration of sensors to correct for distortions, for example, and to perform extrinsic calibration of sensors to align locations within data captured by different sensors, for example, in some cases more information may be necessary or at least useful to confirm and/or understand the positioning of the vehicle 102 itself and the relative positioning of the vehicle 102 and the targets 200/530/540. Key points on the vehicle 120 may be tracked by the scene surveying system 670 to identify the current pose (rotation position) of the vehicle 102. Data captured by the scene surveying system 610 can also be sent to the vehicle 102 and used to verify the data captured by the sensors and the intrinsic and extrinsic calibrations performed based on this data.

Figure 7A:
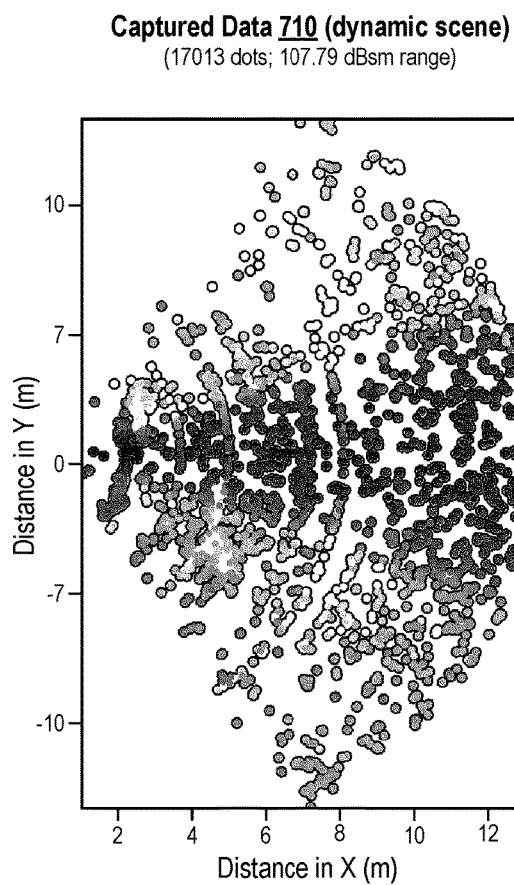
FIG. 7A illustrates captured radar cross section (RCS) data corresponding to a field of view a radar sensor of a vehicle when the vehicle is rotated in a dynamic scene calibration environment.

FIG. 7A illustrates captured radar cross section (RCS) data corresponding to a field of view of a radar sensor of a vehicle.

Specifically, a chart plotting a point cloud, or dot cloud, of captured sensor returns 710 in the form of radar cross section (RCS) dots, measured in decibels relative to a square meter (dBsm) are plotted in distance in meters along a Y axis and distance in meters along an X axis. The dots (or points), together, form the shape of the FOV 410 of one of the vehicle 102's radar sensors, which in this case is a quarter of a circle, or half of a semicircle. As explained in the legend 730 in FIG. 7C, the lighter-colored dots represent stronger RCS returns (i.e., higher dBsm values), while the darker-colored dots represent weaker RCS returns (i.e., lower dBsm values). Each of the dots is outlined in black so as to be easily visible regardless of color.

The chart of captured RCS data 710 of FIG. 7A is captured in the context of a dynamic scene calibration environment 600; that is, the data represents data captured by the radar sensor of the vehicle 102 over the course of one or more rotations of the vehicle 102 while the vehicle is on a motorized turntable 605 that rotates, optionally in various directions and/or along various intervals. If the radar sensor sees a radar calibration target 200, then, one would expect to see an arc of strong-RCS (i.e., high-dBsm) dots representing radar returns corresponding to the radar calibration target 200, each dot in the arc representing that radar calibration target 200 while the vehicle 102 is at a different rotational position. However, while the chart of captured RCS data 710 does appear to have several arc patterns, not all of the dots in these arcs appear to have strong RCS (high-dBsm) values, and any arcs of dots are easy to miss in the captured RCS data 710 among the considerable amount of noise in the captured RCS data 710.

The chart of captured RCS data 710 of FIG. 7A includes noticeably weaker RCS values (i.e., lower dBsm) on average in the center of the field of view 410, and stronger RCS values (i.e., higher dBsm) on average in the sides/edges of the field of view 410. That is, if one were to extend a horizontal line from the 0 meter notch along the Y axis, that line would represent the direction that the sensor of the vehicle 102 faces, and the dots on or close to that line have noticeably weaker RCS values (i.e., lower dBsm) on average, while the dots further away from that line have noticeable stronger RCS values (i.e., higher dBsm) on average.

The reported RCS (radar cross section) of targets from the radar can vary across the FOV 410 in this way, with weaker RCS returns at and near the center of the FOV 410 than at and near the outskirts of the FOV 410, or can vary in ways other than this, largely depending on a number of factors. For example, with other sensors, RCS returns can instead be stronger at and near the center of the FOV 410 than at and near the outskirts of the FOV 410. In some cases, the factors causing such variation effects include firmware, operating system (OS), basic input/output system (BIOS), and/or software running on the sensor and/or on a computer system 1500 (such as vehicle computer 110) that processes outputs of the sensor. That is, in some cases, such firmware/BIOS/OS/software can apply incorrect or improper or skewed corrections to the returns from the sensor, or can pre-process returns in an incorrect or improper or skewed manner. The factors causing the variance effect can alternatively or additionally include mounting positions of sensors, presence and/or type of radome (cover for a radar sensor), any additional materials through which the radar sensor's radio waves must pass through (such as a window or bumper, which may for example be thicker in some areas than others), partial occlusion of the radar sensor, presence of weather effects (e.g., heat, rain, dust, frost, rocks, pollution), damage to the sensor (e.g., caused by weather effects, a vehicular collision, or wear and tear of materials over time), or combinations thereof.

In some cases, effects such as the one shown in the chart of captured RCS data 710 of FIG. 7A, where the center of the chart has weaker RCS returns than the sides/edges of the chart, may be caused by sensor firmware applying improper corrections. In some cases, such effects may be caused by a radar sensor being hidden behind a bumper, window, or other covering material of the vehicle, the bumper or window weakening/scattering radio signals that pass through it, the bumper or window thicker in its center than on its sides/edges, where its sides/edges may even be missing altogether. Effects such as the one shown in the chart of captured RCS data 710 of FIG. 7A can also be caused by warping from a lens, window, or radome through which radio waves output by or received by the radar sensor pass through and are warped, bent, magnified, contracted, or otherwise manipulated by. Effects such as the one shown in the chart of captured RCS data 710 of FIG. 7A can also be caused by effects of weather or a vehicle collision that more strongly affect either the center of the sensor or the left and right sides/edges of the radar sensor.

Incorrect RCS values of targets can cause significant problems with perception by radar sensors, since RCS is often used as a metric to identify how large a target is, both in terms of calibration targets such as radar target 200 and then later in terms of real-world "targets" such as pedestrians, other vehicles, trees, buildings, and so forth. RCS can be used to tell the difference between a pedestrian, a motorcycle, a car, a truck, a tree, a building/house/structure, and so forth. Thus, leaving effects such as those seen in the chart of captured RCS data 710 of FIG. 7A, where the center of the chart has weaker RCS returns than the sides/edges of the chart, is dangerous and risks human lives unless corrected or compensated for in some way, such as via the RCS compensation discussed further herein (see FIGS. 7B through 13C and corresponding discussion), through various filters and machine learning algorithms (see FIG. 14 and corresponding discussion), or some combination thereof.

Figure 7B:
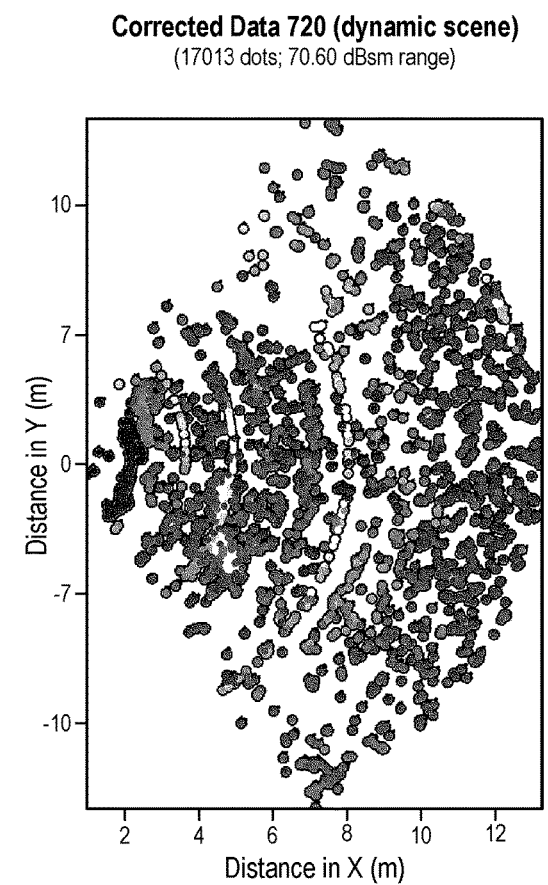
FIG. 7B illustrates a corrected version of the captured RCS data of FIG. 7A.

FIG. 7B illustrates a corrected version of the captured RCS data of FIG. 7A.

Figure 9B:
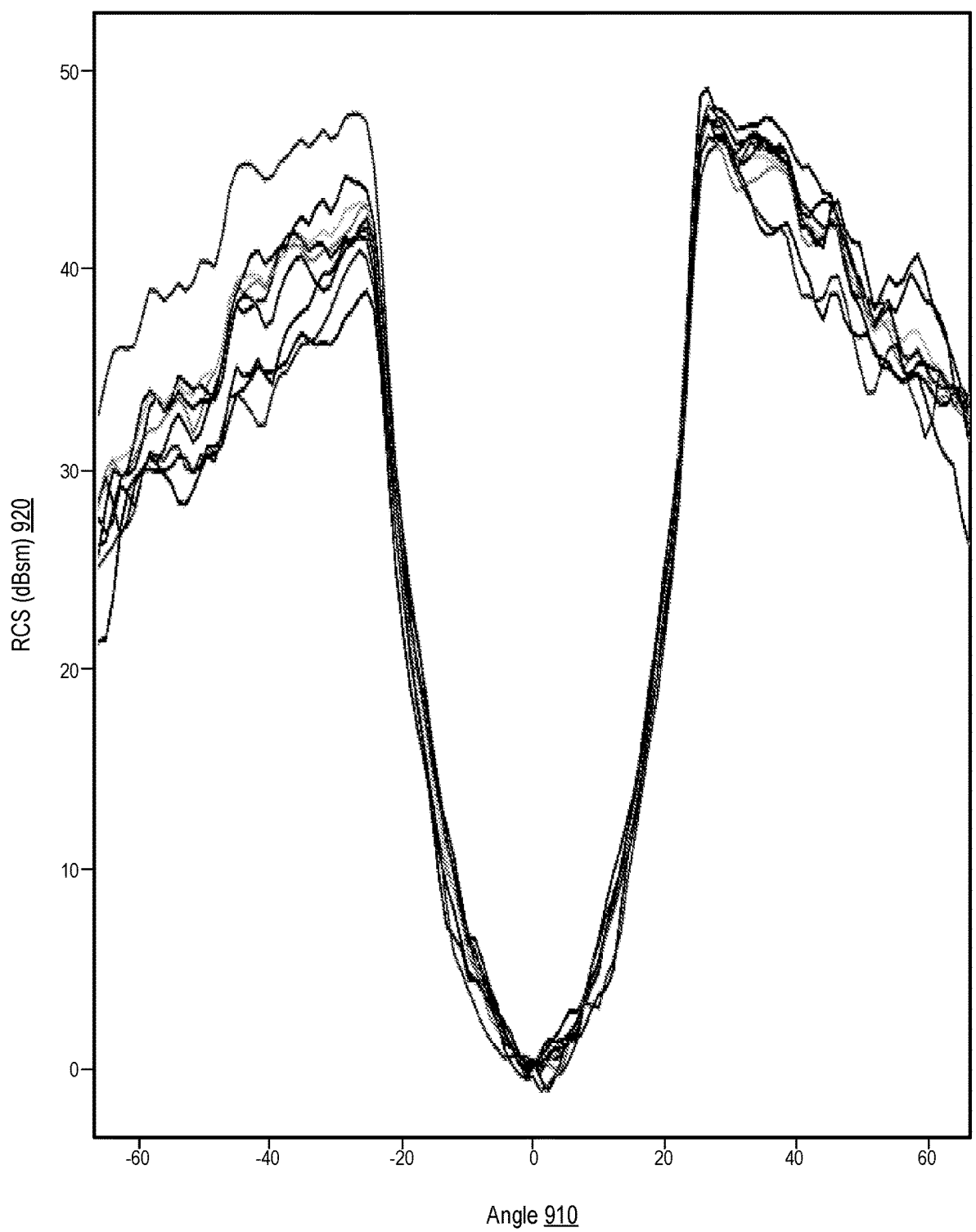
FIG. 9B illustrates a graph of multiple overlaid RCS compensation functions, each function associated with one of a number of sensors of a vehicle.

The corrected version of the chart of captured RCS data 720 of FIG. 7B includes the same data as the chart of captured RCS data 710 of FIG. 7A, but with the RCS strength (i.e., dBsm value) corrected for via RCS compensation to compensate for the effect that produces weaker RCS returns in the center of the original chart 710 than the sides/edges of the original chart 710. This RCS compensation correction is performed by subtracting a value, in dBsm, from the RCS value of each dot, where the subtracted value is higher on the sides/edges than it is in the center. The substracted value is given by an RCS compensation function, which is discussed further herein, and examples of which are shown in FIG. 9A and FIG. 9B. As predicted, the corrected data 720 includes three noticeable arcs of strong-RCS (i.e., high-dBsm) dots, which correspond to radar targets 200, that are visible within the data among weak-RCS (i.e., low-dBsm) dots, which correspond to noise.

The captured data 710 and corrected data 720 both include 17013 dots. The captured data 710 spans a wide 107.79 dBsm range, while the corrected data 720 spans a narrower 70.60 dBsm range.

Figure 7C:
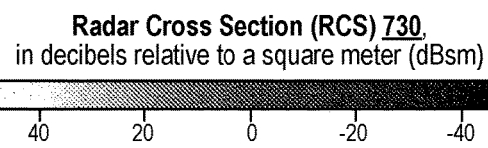
FIG. 7C is a legend corresponding to FIG. 7A that indicates a scale, from white to black, indicating RCS in decibels relative to a square meter (dBsm).

FIG. 7C is a legend corresponding to FIG. 7A that indicates a scale, from white to black, indicating RCS in decibels relative to a square meter (dBsm).

In the scale represented in the legend 730 of FIG. 7C, which identifies the meanings of colors in the captured data 710 of FIG. 7A, the color white represents RCS values over 40 dBsm, the color black represents RCS values under −40 dBsm, and a gradient from white to black represents every RCS value between 40 dBsm and −40 dBsm. The legend 730 includes notches along the scale representing 40 dBsm, 20 dBsm, 0 dBsm, −20 dBsm, and −40 dBsm.

Figure 7D:
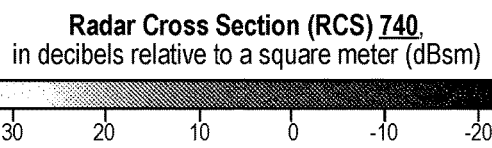
FIG. 7D is a legend corresponding to FIG. 7B that indicates a scale, from white to black, indicating RCS in decibels relative to a square meter (dBsm).

FIG. 7D is a legend corresponding to FIG. 7B that indicates a scale, from white to black, indicating RCS in decibels relative to a square meter (dBsm).

In the scale represented in the legend 740 of FIG. 7D, which identifies the meanings of colors in the correcred data 720 of FIG. 7B, the color white represents RCS values over 30 dBsm, the color black represents RCS values under −20 dBsm, and a gradient from white to black represents every RCS value between 30 dBsm and −20 dBsm. The legend 740 includes notches along the scale representing 30 dBsm, 20 dBsm, 10 dBsm, 0 dBsm, −10 dBsm, and −20 dBsm.

FIG. 8 is a flow diagram identifying operations for calibrating one or more radar sensors of a vehicle using RCS compensation.

At step 805, a motorized turntable 605 is optionally used to rotate a vehicle 102 into a plurality of vehicle positions over a course of a calibration time period, if the vehicle 102 is in a dynamic scene calibration environment 600 such as the one illustrated in FIG. 6. This step is optional, as calibration environments other than the dynamic scene calibration environment 600 may be used, such as a static calibration environment in which the vehicle 102 does not move at all (e.g., the vehicle 102 stays in a single position in front of targets, as in FIG. 3, where the targets may optionally move) or a hallway calibration environment 500 that the vehicle 102 drives through as in FIG. 5. If the hallway calibration environment 500 of FIG. 5 is used, step 805 may be replaced with a step in which the vehicle 102 drives along the throughfare 505 of the hallway calibration environment 500, reaching a plurality of vehicle positions at different points along the throughfare 505.

At step 810, the sensors 180 of the vehicle 102 capture a plurality of sensor calibration capture datasets via one or more sensors coupled to the vehicle 120 over the course of the calibration time period. If a dynamic scene calibration environment 600 or hallway calibration environment 500 is used, step 810 is performed by capturing at least one of the plurality of sensor calibration capture datasets corresponding to fields of view 410 of each of the one or more sensors, each sensor calibration capture dataset captured while the vehicle is at one of the plurality of vehicle positions (i.e., rotation positions in the dynamic scene calibration environment 600 or driving positions in the hallway calibration environment 500). At some of the vehicle positions, certain of the one or more sensors may capture data a plurality of times, while at others of the vehicle positions certain of the one or more sensors may skip capturing data altogether.

At step 815, the vehicle computer 110 of the vehicle 102 receives the plurality of sensor calibration capture datasets from the one or more sensors, either after the calibration time period, over the course of the calibration time period, or some combination thereof. That is, capture of some sensor calibration capture datasets may occur in parallel with sensor calibration based on some already-captured sensor calibration capture datasets.

At optional step 820, data from the field of view dataset of a particular sensor (e.g., a radar sensor or another type of range sensor) is split by the vehicle computer 110 by angle ranges into angle-range-based bins. That is, if the direction that the sensor is facing at a given time is labeled zero degrees, and the field of view 410 of the sensor corresponds to a range from 75 degrees to −75 degrees, the field of view dataset 430 may be split into bins corresponding to: (1) all data from 75 degrees to 74 degrees, (2) all data from 74 degrees to 73 degrees, (3) all data from 73 degrees to 72 degrees, and so forth, up until the final bin with all data from −74 degrees to −75 degrees. More generally, if the field of view 410 of the sensor corresponds to a range from $N_5$ degrees to $-N_5$ degrees, the field of view dataset 430 may be split into bins corresponding to: (1) all data from $N_5$ degrees to $N_5-M$ degrees, (2) all data from $N_5-M$ degrees to $N_5-2M$ degrees, (3) all data from $N_5-2M$ degrees to $N_5-3M$ degrees, and so forth, up until the final bin with all data from $-N_5+M$ degrees to $-N_5$ degrees. In this case, $N_5$ and $M$ may each be, for example, −90, −89, −88, −87, −86, −85, −84, −83, −82, −81, −80, −79, −78, −77, −76, −75, −74, −73, −72, −71, −70, −69, −68, −67, −66, −65, −64, −63, −62, −61, −60, −59, −58, −57, −56, −55, −54, −53, −52, −51, −50, −49, −48, −47, −46, −45, −44, −43, −42, −41, −40, −39, −38, −37, −36, −35, −34, −33, −32, −31, −30, −29, −28, −27, −26, −25, −24, −23, −22, −21, −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90.

At optional step 825, one or more filters may be applied, by the vehicle computer 110, to the RCS values in a FOV dataset captured by the sensor, either to data from each bin after being split into angle-range-based bins in optional step 820 individually or to the entire FOV dataset before (or without) being split into angle-range-based bins in optional step 820. The one or more filters used at step 825 may include, but are not limited do, a median filter, a mean filter, a mode filter, a sliding window filter (SWF), a moving average (mean) (MA) filter, a moving median filter, a moving mode filter, another rank-conditioned rank-selection (RCRS) filter, another rank-selection (RS) filter, another non-linear filter, a smoother matrix, a hat matrix, a convolution matrix, a convolution kernel, additive smoothing, a Butterworth filter, a Chebyshev filter, a digital filter, an elliptic filter, exponential smoothing, a Kalman filter, a kernel smoother, a Kolmogorov-Zurbenko filter, a linear filter, Laplacian smoothing, local regression, a low-pass filter, a high-pass filter, a band-pass filter, a Ramer-Douglas-Peucker algorithm, a Savitzky-Golay smoothing filter, a smoothing spline, a stretched grid algorithm, or some combination thereof. This reduces outliers, such as very high or very low RCS values, and thus reduces noise and recovers sensor returns corresponding to actual targets and clutter.

At step 830, the vehicle computer 110 generates and stores a function, the function plotting processed RCS values (or other strength values if the range sensor is not a radar sensor) over the field of view 410 of the sensor (e.g., RCS strength values tracked along a Y axis) against angles within the field of view 410 of the sensor (e.g., angle values tracked along an X axis). That is, if the direction the sensor is facing at a given time is labeled zero degrees, and the field of view 410 corresponds to a range from 75 degrees to −75 degrees (or $N_5$ degrees to $-N_5$ degrees), then the function generated in step 830 includes RCS values for every angle (or many angles) from 75 degrees to −75 degrees (or $N_5$ degrees to $-N_5$ degrees), with each data point connected to the next one along the angle axis so that the function is a continuous line. The function generated in step 830 may be referred to as the RCS compensation function, and may then be used to compensate for various effects seen in sensor readings such as the one visible in and discussed with respect to the captured data 710 of FIG. 7A. An example of such an RCS compensation function, both with and without the smoothing of optional step 835 applied, is illustrated in FIG. 9A. Additional examples of multiple RCS compensation functions associated with multiple different sensors are illustrated in FIG. 9B. The processing of the RCS values (or other strength values) may include shifting of RCS distributions from raw sensor data captured during calibration as shown in the graph 1650 of FIG. 16B as compared to the graph 1600 of FIG. 16A. Other non-radar range sensors, such as LIDAR, SONAR, SODAR, or EmDAR sensors, might use other types of strength values than RCS, which may in some cases correspond to signal magnitude, signal amplitude, signal wavelength, signal frequency, or some combination thereof. The signal may be a light signal, a sound signal, or a signal otherwise along the electromagnetic spectrum depending on whether the sensor is a LIDAR, SONAR, SODAR, or EmDAR sensor.

At optional step 835, smoothing is optionally applied to the RCS compensation function generated in step 830, the reducing the number of "peaks" and "valleys" in the data. Smoothing may be achieved by applying one or more filters or algorithms to the data in an RCS compensation function, including but not limited to a smoother matrix, a hat matrix, a convolution matrix, a convolution kernel, additive smoothing, a Butterworth filter, a Chebyshev filter, a digital filter, an elliptic filter, exponential smoothing, a Kalman filter, a kernel smoother, a Kolmogorov-Zurbenko filter, a linear filter, Laplacian smoothing, local regression, a low-pass filter, a high-pass filter, a band-pass filter, a Ramer-Douglas-Peucker algorithm, a Savitzky-Golay smoothing filter, a smoothing spline, a stretched grid algorithm, a median filter, a mean filter, a mode filter, a sliding window filter (SWF), a moving average (mean) (MA) filter, a moving median filter, a moving mode filter, another rank-conditioned rank-selection (RCRS) filter, another rank-selection (RS) filter, another non-linear filter, or some combination thereof.

Note that the RCS compensation function generated for the sensor at step 820 may be generated for each sensor of the one or more sensors 180 of the vehicle from which one of the sensor calibration capture datasets is received at step 815. Step 830, optionally in addition to one or more of optional steps 820, 825, and 835 may optionally occur for each of these generated RCS compensation function in any order/permutatoin for each RCS compensation function.

At step 840, the vehicle 102 captures post-calibration sensor capture datasets via the one or more sensors 180 after the calibration time period, and the vehicle computer 110 receives the post-calibration sensor capture datasets. At step 845, for the post-calibration sensor capture dataset corresponding to each sensor of the one or more sensors, the vehicle computer 110 modifies the post-calibration sensor capture datasets based on the function, for example by subtracting values corresponding to the RCS compensation function generated and stored at step 830 corresponding to the sensor (which is optionally smoothed at step 835) from each captured data point in the post-calibration sensor capture dataset. That is, for a post-calibration sensor capture data point captured at 75 degrees in the field of view 410 of a sensor, the RCS value from the RCS compensation function at 75 degrees is subtracted. Likewise, for a post-calibration sensor capture data point captured at 5 degrees in the field of view 410 of the sensor, the RCS value from the RCS compensation function at 5 degrees is subtracted. Note that in some cases, the RCS compensation function may be negative at some portions, in which case subtracting the RCS compensation function at those portions would actually effectively increase, or add to, the corresponding post-calibration sensor capture data points.

Note that while step 845 discusses subtracting values from the RCS compensation function from each captured data point in the post-calibration sensor capture datasets as one example of modifying the post-calibration sensor capture datasets using the RCS compensation function, in other cases, the post-calibration sensor capture datasets may be modified in different ways using the RCS compensation function. For example, while the RCS compensation function discussed herein uses the dB scale (along the Y axis 920 in the context of FIGS. 9A and 9B) for RCS measurements, the dB scale being a nonlinear logarithmic scale, the RCS compensation function could instead use a linear measurement scale (along the Y axis 920 in the context of FIGS. 9A and 9B). In such cases, the post-calibration sensor capture data points may actually be divided by the RCS compensation function at step 845. Ultimately, modifying the post-calibration sensor capture datasets using the RCS compensation function may entail adding at least a portion of the RCS compensation function values to the corresponding post-calibration sensor capture data points, subtracting the RCS compensation function values from the corresponding post-calibration sensor capture data points, multiplying the RCS compensation function values by the corresponding post-calibration sensor capture data points, dividing the post-calibration sensor capture data points by the corresponding RCS compensation function values, or some combination thereof. At optional step 850, data points with RCS values less than pre-determined minimum RCS threshold can be removed by the vehicle computer 110 to remove weak radar sensor returns and thus remove noise. The pre-determined minimum RCS threshold may be $N_6$ dBsm, where $N_6$ is, for example, −40, −39, −38, −37, −36, −35, −34, −33, −32, −31, −30, −29, −28, −27, −26, −25, −24, −23, −22, −21, −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40.

FIG. 9A illustrates a graph of a RCS compensation function both with and without smoothing.

The RCS compensation function—that is, the function generated and stored at step 830 of the flow diagram of FIG. 8—is plotted in FIG. 9A along an X-Y plane, with the horizontal X axis 910 representing angle relative to the direction the sensor is facing, and with the Y axis 920 representing RCS as measured in dBsm. Two variants of the RCS compensation function are plotted—one without any smoothing applied (illustrated in grey as indicated in the legend 930, with many peaks and valleys), and the other with smoothing applied (illustrated in black as indicated in the legend 930, smoothed out) as in optional step 835 of FIG. 8.

The RCS compensation function in FIG. 9A is representative of the effect seen in the captured data 710 of FIG. 7A, where sensor returns near the center of the chart (that is, at angles at or near zero degrees relative to the direction that the sensor faces) have generally weaker RCS returns than sensor returns further away from the center of the chart and instead near the sides/edges of the chart (e.g., around 40 to 60 degrees, or around −40 to −60 degrees relative to the direction that the sensor faces).

Corrections to post-calibration data subtract the RCS calibration function 900 from the post-calibration data, as discussed further with respect to step 845 of the flow diagram of FIG. 8. That is, for a post-calibration sensor capture data point captured at 50 degrees in the field of view 410 of a sensor, the RCS value from the RCS compensation function at 50 degrees is subtracted, while for a post-calibration sensor capture data point captured at 0 degrees in the field of view 410 of the sensor, the RCS value from the RCS compensation function at 0 degrees is subtracted. Because the RCS compensation function is greater near the edges and lower in the center, a higher amount is subtracted near the edges in RCS compensation, where the effect seen in the captured data 710 of FIG. 7A indicates that RCS values are generally artificially higher, while a lower amount is subtracted near the center in RCS compensation, where the effect seen in the captured data 710 of FIG. 7A indicates that RCS values are generally artificially lower. Thus, subtracting the RCS calibration function 900 of FIG. 9 from the captured data 710 of FIG. 7A returns the corrected data 720 of FIG. 7B (or something similar), where the data at or near the center changes very little, and where the data at or near the edges changes is brought down in dBsm more dramatically.

FIG. 9B illustrates a graph of multiple overlaid RCS compensation functions, each function associated with one of a number of sensors of a vehicle.

The multiple RCS compensation functions 950 in FIG. 9B each correspond to one radar sensor of multiple radar sensors of the vehicle 102. Each of the sensors produce a similar type of RCS curve that is lower in the center and higher at the edges, as also visible in the RCS compensation function 900 of FIG. 9A. This consistency in the RCS compensation functions 950 may indicate that RCS returns from all or most radar sensors of a particular type (e.g., manufacturer, model) are characterized by this effect. Smoothing as in step 845, then, can produce a RCS compensation function that in some cases can successfully be applied to multiple sensors of the type.

In some cases, data from multiple RCS compensation functions can be combined into a single RCS compensation function. This combination may be achieved by, at each angle, using a mean, median, mode, maximum, or minimum RCS value from the multiple RCS compensation functions.

Figure 10A:
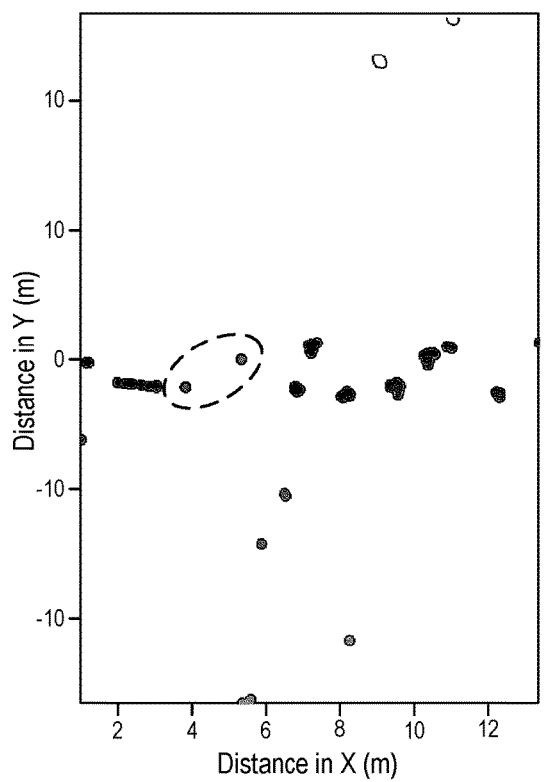
FIG. 10A illustrates captured RCS data corresponding to a field of view of a radar sensor of a vehicle when the vehicle is in the static calibration environment of FIG. 3.

FIG. 10A illustrates captured radar cross section (RCS) data corresponding to a field of view of a radar sensor of a vehicle when the vehicle is in the static calibration environment of FIG. 3.

That is, the captured data 1010 produced in FIG. 10A is captured by the vehicle 102 of FIG. 3, of the two radar calibration targets 200 of FIG. 3 mounted on the target support structure 310 of FIG. 3. The two dots representing the two radar calibration targets 200 of FIG. 3 are circled using an ellipse with a dashed line. In the captured data 1010, the two dots representing the two radar calibration targets 200 of FIG. 3 produce a low RCS, almost as low as the dots representing noise around them, and making them nearly indistinguishable from the noise. This is due to the same effect observed in the captured data 710 of FIG. 7A, where sensor returns near the center of the chart (that is, at angles at or near zero degrees) have generally weaker RCS returns than sensor returns further away from the center of the chart and instead near the sides/edges of the chart (further away from zero degrees). The captured data 1010 of FIG. 10A includes 764 dots spanning a 92.48 dBsm RCS range.

Figure 10B:
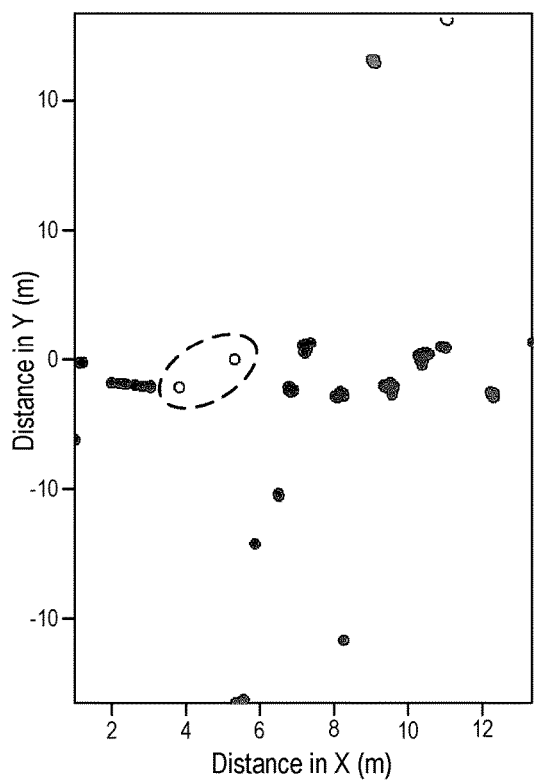
FIG. 10B illustrates a corrected version of the captured RCS data of FIG. 10A.

FIG. 10B illustrates a corrected version of the captured RCS data of FIG. 10A.

By subtracting the RCS compensation function 900 from the captured data 1010, the two dots representing the two radar calibration targets 200 of FIG. 3, which are again circled using an ellipse with a dashed line, clearly stand out from the noise. Thus, the corrected data 1020, which is produced by subtracting the RCS compensation function 900 from the captured data 1010, results in a more accurate radar reading than the captured data 1010. The corrected data 1020 of FIG. 10B includes 764 dots spanning a 65.56 dBsm RCS range.

Figure 10C:
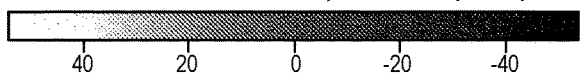
FIG. 10C is a legend corresponding to FIG. 10A that indicates a scale, from white to black, indicating RCS in decibels relative to a square meter (dBsm).

FIG. 10C is a legend corresponding to FIG. 10A that indicates a scale, from white to black, indicating RCS in decibels relative to a square meter (dBsm).

The legend 730 of FIG. 7C is reproduced again as the legend 1030 of FIG. 10C, as the same color scale is used in FIG. 10A as in FIG. 7A.

Figure 10D:
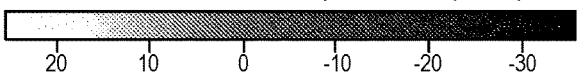
FIG. 10D is a legend corresponding to FIG. 10B that indicates a scale, from white to black, indicating RCS in decibels relative to a square meter (dBsm).

FIG. 10D is a legend corresponding to FIG. 10B that indicates a scale, from white to black, indicating RCS in decibels relative to a square meter (dBsm).

In the scale represented in the legend 1040 of FIG. 10D, which identifies the meanings of colors in the corrected data 1020 of FIG. 10B, the color white represents RCS values over 20 dBsm, the color black represents RCS values under −30 dBsm, and a gradient from white to black represents every RCS value between 20 dBsm and −30 dBsm. The legend 1040 includes notches along the scale representing 20 dBsm, 10 dBsm, 0 dBsm, −10 dBsm, −20 dBsm, and −30 dBsm.

Figure 11A:
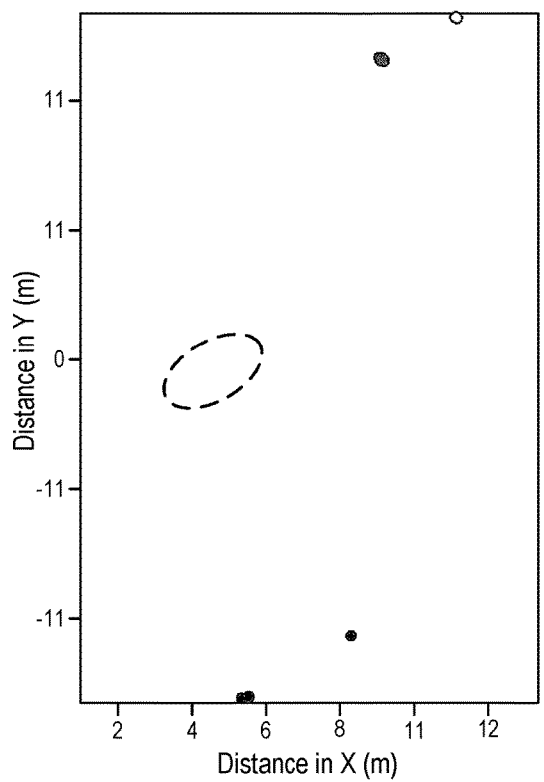
FIG. 11A illustrates the captured RCS data of FIG. 10A, with a minimum RCS threshold applied to remove low RCS values.

FIG. 11A illustrates the captured RCS data of FIG. 10A, with a minimum RCS threshold applied to remove low RCS values.

The minimum RCS threshold 1115 applied in FIG. 11A is 22 dBsm, and is applied as discussed in step 850 of FIG. 8, but directly to the captured data 1010. The two dots representing the two radar calibration targets 200 of FIG. 3 end up getting removed because they are below the threshold, along with all other dots in or near the center of the captured data chart 1110. This is due to the effect observed in the captured data 710 of FIG. 7A and in the captured data 1010 of FIG. 10, where sensor returns near the center of the chart (that is, at angles at or near zero degrees relative to the direction the sensor is facing) have generally weaker RCS returns than sensor returns further away from the center of the chart and instead near the sides/edges of the chart (further away from zero degrees relative to the direction the sensor is facing). The area where the two dots representing the two radar calibration targets 200 of FIG. 3 should be is still circled using an ellipse with a dashed line.

Figure 11B:
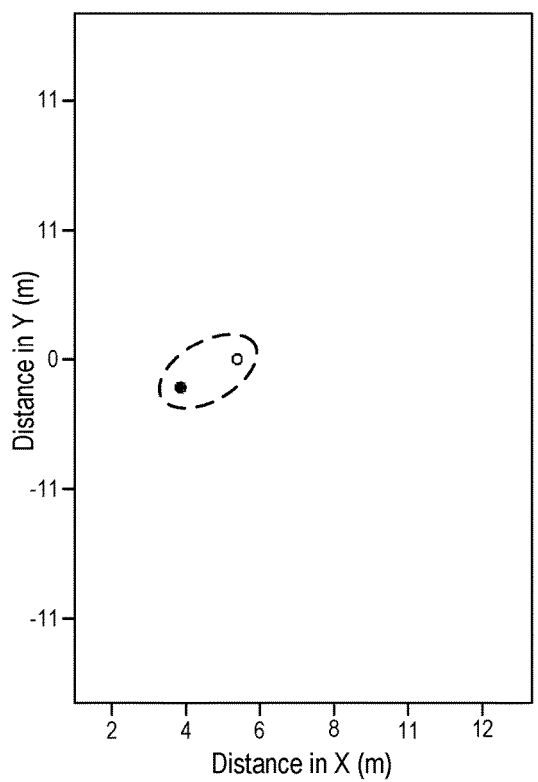
FIG. 11B illustrates the corrected RCS data of FIG. 10B, with the minimum RCS threshold of FIG. 11A applied to remove low RCS values.

FIG. 11B illustrates the corrected RCS data of FIG. 10B, with the minimum RCS threshold of FIG. 11A applied to remove low RCS values.

The same 22 dBsm minimum RCS threshold 1115 that was applied to the captured data 1010 of FIG. 10A to produce the threshold-applied captured data with 1110 of FIG. 11A is now applied to the corrected data 1020 of FIG. 10B to produce the threshold-applied corrected data 1120 of FIG. 11B, as discussed in step 850 of FIG. 8. This time, the only two dots remaining after the minimum RCS threshold 1115 is applied are the two dots representing the two radar calibration targets 200 of FIG. 3, which are again circled using an ellipse with a dashed line. Thus, a minimum RCS threshold 1115 may be useful to remove noise and leave only target data.

Figure 11C:
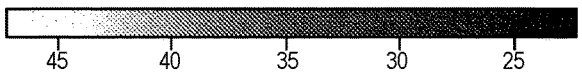
FIG. 11C is a legend corresponding to FIG. 11A that indicates a scale, from white to black, indicating RCS in decibels relative to a square meter (dBsm), edited from the legend of FIG. 7C based on the minimum RCS threshold of FIG. 11A.

FIG. 11C is a legend corresponding to FIG. 11A that indicates a scale, from white to black, indicating RCS in decibels relative to a square meter (dBsm), edited from the legend of FIG. 7C based on the minimum RCS threshold of FIG. 11A.

In the scale represented in the legend 1130 of FIG. 11C, which identifies the meanings of colors in the captured data 1110 of FIG. 11A. the color white represents RCS values over 45 dBsm, the color black represents RCS values under 25 dBsm, and a gradient from white to black represents every RCS value between 45 dBsm and 25 dBsm. The legend 1130 includes notches along the scale representing 45 dBsm, 40 dBsm, 35 dBsm, 30 dBsm, and 25 dBsm.

Figure 11D:
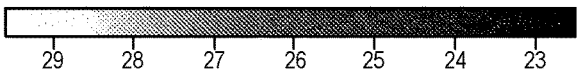
FIG. 11D is a legend corresponding to FIG. 11B that indicates a scale, from white to black, indicating RCS in decibels relative to a square meter (dBsm).

FIG. 11D is a legend corresponding to FIG. 11B that indicates a scale, from white to black, indicating RCS in decibels relative to a square meter (dBsm).

In the scale represented in the legend 1140 of FIG. 11D, which identifies the meanings of colors in the corrected data 1120 of FIG. 11B, the color white represents RCS values over 29 dBsm, the color black represents RCS values under 23 dBsm, and a gradient from white to black represents every RCS value between 29 dBsm and 23 dBsm. The legend 1140 includes notches along the scale representing 29 dBsm, 28 dBsm, 27 dBsm, 26 dBsm, 25 dBsm, 24 dBsm, and 23 dBsm.

Figure 12A:
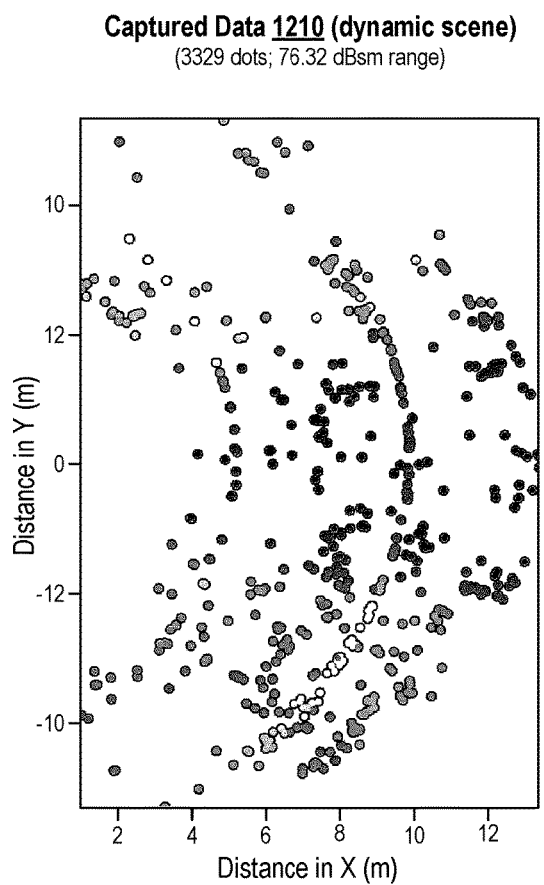
FIG. 12A illustrates captured radar cross section (RCS) data corresponding to a field of view of a radar sensor of a vehicle when the vehicle is rotated in a dynamic scene calibration environment.

FIG. 12A illustrates captured radar cross section (RCS) data corresponding to a field of view of a radar sensor of a vehicle when the vehicle is rotated in a dynamic scene calibration environment.

The captured data 1210 produced in FIG. 12A is captured by the vehicle 102 in the context of a dynamic scene calibration environment 600; that is, the data represents data captured by the radar sensors of the vehicle 102 over the course of various rotation intervals of the vehicle 102 while the vehicle is on a motorized turntable 605 that rotates along various intervals. Thus, one would expect to see an arc of strong-RCS (i.e., high-dBsm) dots representing radar returns corresponding to each radar calibration target 200, each dot in the arc representing that radar calibration target 200 while the vehicle 102 is at a different rotational position. The captured data 1210 produced in FIG. 12A includes two noticeable arcs of dots that are weak-RCS (i.e., low-dBsm) near the center of the chart and high-RCS (i.e., high-dBsm) around the edges/sides of the chart, among a number of other dots representing noise. This indicates that two radar calibration targets 200 were present in the dynamic scene calibration environment in which the vehicle 102 produced the captured data 1210 results.

The variation in the arc coloring is due to the effect observed in the captured data 710 of FIG. 7A and in the captured data 1010 of FIG. 10, where sensor returns near the center of the chart (that is, at angles at or near zero degrees relative to the direction the sensor is facing) have generally weaker RCS returns than sensor returns further away from the center of the chart and instead near the sides/edges of the chart (further away from zero degrees relative to the direction the sensor is facing).

The captured data 1210 of FIG. 10A includes 3329 dots spanning a 76.32 dBsm RCS range.

Figure 12B:
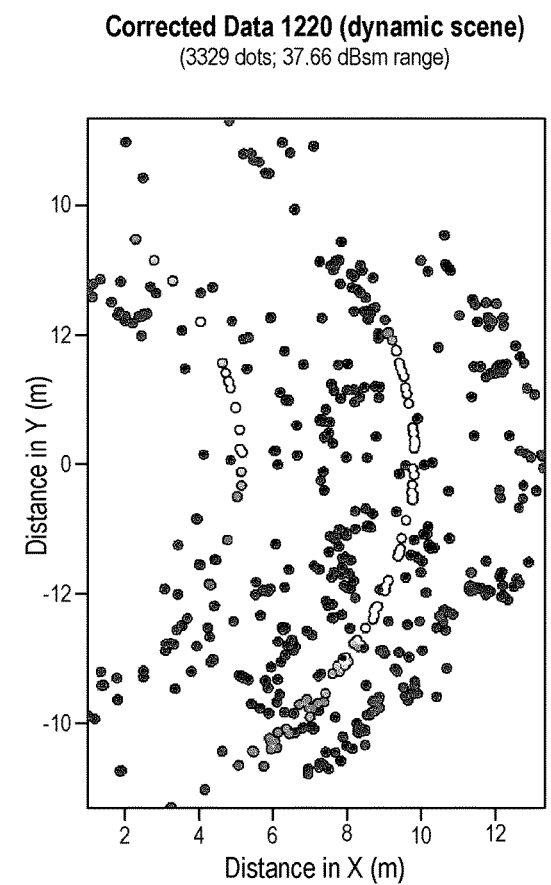
FIG. 12B illustrates a corrected version of the captured RCS data of FIG. 12A.

FIG. 12B illustrates a corrected version of the captured RCS data of FIG. 12A.

By subtracting the RCS compensation function 900 from the captured data 1210, the two arcs of dots in the captured data 1010 are now comprised almost entirely of high-RCS (i.e., high-dBsm) dots and more clearly stand out from the noise, as would be expected from two radar calibration targets 200 in a dynamic scene. Thus, the corrected data 1220, which is produced by subtracting the RCS compensation function 900 from the captured data 1210, results in a more accurate radar reading than the captured data 1210. The corrected data 1220 of FIG. 12B includes 3329 dots spanning a 37.66 dBsm RCS range.

Figure 12C:
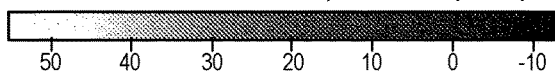
FIG. 12C is a legend corresponding to FIG. 12A that indicates a scale, from white to black, indicating RCS in decibels relative to a square meter (dBsm).

FIG. 12C is a legend corresponding to FIG. 12A that indicates a scale, from white to black, indicating RCS in decibels relative to a square meter (dBsm).

In the scale represented in the legend 1230 of FIG. 12C, which identifies the meanings of colors in the captured data 1210 of FIG. 12A. the color white represents RCS values over 50 dBsm, the color black represents RCS values under −10 dBsm, and a gradient from white to black represents every RCS value between 50 dBsm and −10 dBsm. The legend 1230 includes notches along the scale representing 50 dBsm, 40 dBsm, 30 dBsm, 20 dBsm, 10 dBsm, 0 dBsm, and −10 dBsm.

Figure 12D:
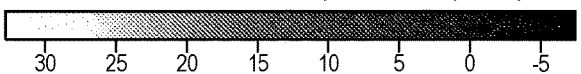
FIG. 12D is a legend corresponding to FIG. 12B that indicates a scale, from white to black, indicating RCS in decibels relative to a square meter (dBsm).

FIG. 12D is a legend corresponding to FIG. 12B that indicates a scale, from white to black, indicating RCS in decibels relative to a square meter (dBsm).

In the scale represented in the legend 1240 of FIG. 12D, which identifies the meanings of colors in the corrected data 1220 of FIG. 12B, the color white represents RCS values over 30 dBsm, the color black represents RCS values under −5 dBsm, and a gradient from white to black represents every RCS value between 30 dBsm and −5 dBsm. The legend 1240 includes notches along the scale representing 30 dBsm, 25 dBsm, 20 dBsm, 15 dBsm, 10 dBsm, 5 dBsm, 0 dBsm, and −5 dBsm.

Figure 13A:
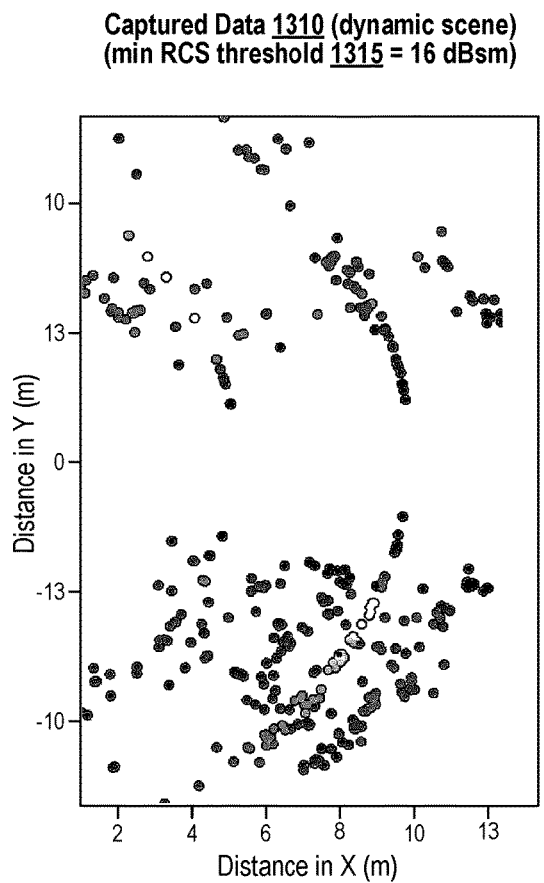
FIG. 13A illustrates the captured RCS data of FIG. 12A, with a minimum RCS threshold applied to remove low RCS values.

FIG. 13A illustrates the captured RCS data of FIG. 12A, with a minimum RCS threshold applied to remove low RCS values.

The minimum RCS threshold 1315 applied in FIG. 11A is 16 dBsm, and is applied as discussed in step 850 of FIG. 8, but directly to the captured data 1210. The two dots representing the two radar calibration targets 200 of FIG. 3 end up getting removed because they are below the threshold, along with all other dots in or near the center of the captured data chart 1110. This is due to the effect observed in the captured data 710 of FIG. 7A and in the captured data 1010 of FIG. 10, where sensor returns near the center of the chart (that is, at angles at or near zero degrees relative to the direction the sensor is facing) have generally weaker RCS returns than sensor returns further away from the center of the chart and instead near the sides/edges of the chart (further away from zero degrees relative to the direction the sensor is facing). The area where the two dots representing the two radar calibration targets 200 of FIG. 3 should be is still circled using an ellipse with a dashed line.

Figure 13B:
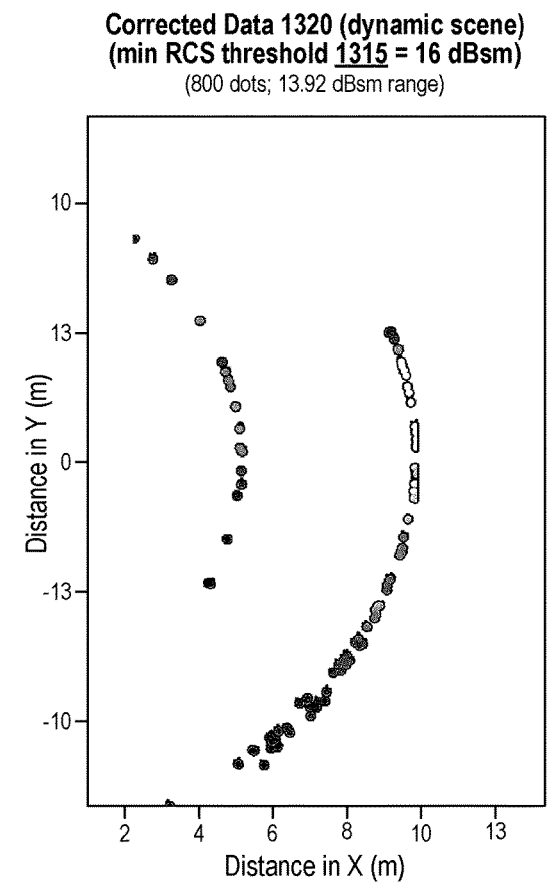
FIG. 13B illustrates the corrected RCS data of FIG. 12B, with the minimum RCS threshold of FIG. 13A applied to remove low RCS values.

FIG. 13B illustrates the corrected RCS data of FIG. 12B, with the minimum RCS threshold of FIG. 13A applied to remove low RCS values.

The same 16 dBsm minimum RCS threshold 1315 that was applied to the captured data 1210 of FIG. 12A to produce the threshold-applied captured data 1310 of FIG. 13A is now applied to the corrected data 1220 of FIG. 12B to produce the threshold-applied corrected data 1320 of FIG. 13B, as discussed in step 850 of FIG. 8. This time, the only dots remaining after the minimum RCS threshold 1315 is applied are the dots of the two dot arcs representing the two radar calibration targets 200 as seen over a range of vehicle rotation positions. Thus, a minimum RCS threshold 1315 may be useful to remove noise and leave only target data.

Figure 13C:
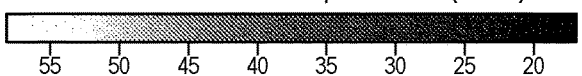
FIG. 13C is a legend corresponding to FIG. 13A that indicates a scale, from white to black, indicating RCS in decibels relative to a square meter (dBsm), edited from the legend of FIG. 12C based on the minimum RCS threshold of FIG. 13A.

FIG. 13C is a legend corresponding to FIG. 13A that indicates a scale, from white to black, indicating RCS in decibels relative to a square meter (dBsm), edited from the legend of FIG. 12C based on the minimum RCS threshold of FIG. 13A.

In the scale represented in the legend 1330 of FIG. 13C, which identifies the meanings of colors in the captured data 1310 of FIG. 13A. the color white represents RCS values over 55 dBsm, the color black represents RCS values under 20 dBsm, and a gradient from white to black represents every RCS value between 55 dBsm and 20 dBsm. The legend 1330 includes notches along the scale representing 55 dBsm, 50 dBsm, 45 dBsm, 40 dBsm, 35 dBsm, 30 dBsm, 25 dBsm, and 20 dBsm.

Figure 13D:
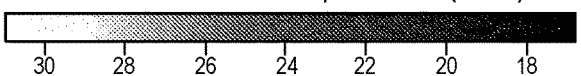
FIG. 13D is a legend corresponding to FIG. 13B that indicates a scale, from white to black, indicating RCS in decibels relative to a square meter (dBsm).

FIG. 13D is a legend corresponding to FIG. 13B that indicates a scale, from white to black, indicating RCS in decibels relative to a square meter (dBsm).

In the scale represented in the legend 1340 of FIG. 13D, which identifies the meanings of colors in the corrected data 1320 of FIG. 13B, the color white represents RCS values over 30 dBsm, the color black represents RCS values under 18 dBsm, and a gradient from white to black represents every RCS value between 30 dBsm and 18 dBsm. The legend 1340 includes notches along the scale representing 30 dBsm, 28 dBsm, 26 dBsm, 24 dBsm, 22 dBsm, 20 dBsm, and 18 dBsm.

FIG. 14 is a flow diagram illustrating operations for detecting targets in a RCS point cloud that may be performed instead of, or in addition to, RCS compensation.

The alternate and/or additional operations for detecting targets in a RCS point cloud may be applied instead of, or in addition to, the RCS compensation function (as generated in step 830 of FIG. 8) and subtraction of the RCS compensation function values from post-calibration sensor data (as in step 845 of FIG. 8). The steps in FIG. 14 are optional, and example values are provided.

At step 1410, the vehicle computer 110 applies a rough filter. The rough filter may, for example, filter out any radar readings outside of a range with pre-determined minimum distance from the vehicle 102 (e.g., 1 m) and a pre-determined maximum distance from the vehicle 102 (e.g. 20 m). The rough filter may, for example, filter out any radar readings with an RCS less than a pre-determined number of dBsm (e.g., 5 dBsm). The rough filter may, for example, filter out any radar readings outside of a pre-determined angle range in either angular direction from the direction the vehicle 102 is facing (e.g., 45 degrees). The rough filter may be, for example, a high-pass filter, a low-pass filter, or a band-pass filter.

At step 1420, the vehicle computer 110 filters by feature. The filter by feature may, for example, filter out any radar readings for targets 200 where a known distance between targets (also referred to as "corner reflector separation") varies from a pre-determined value (e.g., 1.68757 m) by more than a pre-determined tolerance value (e.g., 0.15717 m).

At step 1430, the vehicle computer 110 applies density-based spatial clustering of applications with noise (DBSCAN) or a similar data clustering algorithm to remove outliers. The DBSCAN algorithm may be run with a pre-determined epsilon value (e.g., 0.3 m), a pre-determined minimum number of samples (e.g., 5 samples), and may be run to locate clusters or centroids of targets 200 with highest density and correct separation of thepre-determined value (e.g., the known distance of 1.68757 m between targets).

While various flow diagrams provided and described above, such as those in FIGS. 8 and 14, may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system #00 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

FIG. 16A illustrates a graph with a distribution of RCS values at various FOV angles without fitting.

The graph 1600 of FIG. 16A plots several distributions of RCS values, each corresponding to a particular angle in a FOV 410 of a sensor, along an X-Y plane, with the horizontal X axis 1610 tracking RCS in dBsm, and with the vertical Y axis 1620 tracking samples (i.e., how many returns of a particular RCS return were tracked in the angle corresponding to the distribution). The distributions in the graph may represent many uses of the sensor, for example at different rotation positions in a dynamic scene calibration environment 600 as in FIG. 6, or at different vehicle positions along the thoroughfare in a hallway scene calibration environment 500 as in FIG. 5.

The four distributions 1630, 1635, 1640, and 1645 of the graph 1600 of FIG. 16A are off-center with respect to each other along the horizontal X axis 1610 in the graph, as might be expected due to the effect seen in the captured data 710 of FIG. 7A, where sensor returns near the center of the chart (that is, at angles at or near zero degrees relative to the direction that the sensor faces) have generally weaker RCS returns than sensor returns further away from the center of the chart and instead near the sides/edges of the chart (e.g., around 40 to 60 degrees, or around −40 to −60 degrees relative to the direction that the sensor faces). That is, the RCS distribution corresponding to zero degrees 1630 and the RCS distribution corresponding to −20 degrees 1635 are further to the left and generally see weaker RCS returns, which is expected because these angles are closer to the center and likewise see weaker RCS returns in the captured data 710 of FIG. 7A. Meanwhile, the RCS distribution corresponding to −40 degrees 1640 and the RCS distribution corresponding to −60 degrees 1645 are further to the right and generally see stronger RCS returns, which is expected because these angles are further from the center and likewise see stronger RCS returns in the captured data 710 of FIG. 7A. The RCS distribution corresponding to −60 degrees 1645 actually sees weaker RCS returns than the RCS distribution corresponding to −40 degrees 1640; a similar effect is visible in the RCS distributions 900 and 950 of FIG. 9A and FIG. 9B, respectively.

The four distributions 1630, 1635, 1640, and 1645 of the graph 1600 of FIG. 16A also see different height peaks, representing number of samples, along the Y axis 1620. This is also expected, as sensors generally detect returns most reliably near the center of a FOV 410 of the sensor, and worse near the edges of the FOV 410 the sensor. The RCS distribution corresponding to zero degrees 1630 includes a highest graphed peak, indicating the highest number of RCS returns. The RCS distribution corresponding to −20 degrees 1635 includes a slightly lower peak, indicating a slightly lower number of RCS returns. The RCS distribution corresponding to −40 degrees 1640 includes an even lower peak, indicating an even lower number of RCS returns. The RCS distribution corresponding to −60 degrees 1645 includes a lowest graphed peak, indicating the lowest number of RCS returns.

FIG. 16B illustrates a graph with the distribution of RCS values at various FOV angles of FIG. 16A with fitting.

At FIG. 16B, the four distributions 1630, 1635, 1640, and 1645 of the graph 1600 of FIG. 16A are moved along the X axis 1610 to better align with each other, a process known as fitting the distributions. The zero-degree distribution 1630 is moved to the right slightly to generate newly moved zero-degree distribution 1660 representing the same distribution but corresponding to higher RCS values. The −20-degree distribution 1635 is also moved to the right slightly to generate newly moved −20-degree distribution 1665 representing the same distribution but corresponding to higher RCS values. The −40-degree distribution 1640 is moved to the left to generate newly moved −40-degree distribution 1670 representing the same distribution but corresponding to higher RCS values. The −60-degree distribution 1645 is moved to the right slightly to generate newly moved −60-degree distribution 1675 representing the same distribution but corresponding to higher RCS values.

The movements of the four distributions 1630, 1635, 1640, and 1645 of the graph 1600 of FIG. 16A to generate the four distributions 1660, 1665, 1670, and 1675 of the graph 1650 of FIG. 16B may be performed by aligning the distributions so that the trailing edge (i.e., the rightmost nonzero point) of each distribution is aligned. Performing such a fitting allows generation of a more accurate RCS compensation function as in step 830 of FIG. 8. That is, RCS compensation function generated at step 830 can be based off of the amount of offset needed to match the distributions.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices, for example by encrypting such information.

FIG. 15 shows an example of computing system 1500, which can be for example any computing device making up internal computing system 110, remote computing system 150, potential passenger device executing rideshare app 170, or any component thereof in which the components of the system are in communication with each other using connection 1505. Connection 1505 can be a physical connection via a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache of high-speed memory 1512 connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms known to those of skill in the art. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications via wired and/or wireless transceivers, including those making use of a audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for vehicle sensor calibration, the system comprising:
   a range sensor coupled to a vehicle, wherein the range sensor tracks range data within a field of view that includes a portion of an environment of the vehicle, wherein the range sensor captures a plurality of sensor calibration datasets during a calibration time period, wherein the range sensor also captures a plurality of sensor post-calibration datasets after the calibration time period;
a memory storing instructions; and
a processor that executes the instructions, wherein execution of the instructions by the processor causes the processor to:
receive the plurality of sensor calibration datasets from the range sensor,
generate a function plotting strength values of the plurality of sensor calibration datasets over the field of view against angles within the field of view, wherein the range sensor is a radio detection and ranging (RADAR) sensor, wherein the strength values of sensor detections of the plurality of sensor calibration datasets over the field of view plotted in the function are radio detection and ranging (RADAR) cross section (RCS) values,
receive the plurality of sensor post-calibration datasets from the range sensor, and
automatically modify the plurality of sensor post-calibration datasets based on the function.

2. The system of claim 1, wherein the angles within the field of view of the environment of the vehicle are angles relative to a direction that the range sensor is facing.

3. The system of claim 1, wherein the function is an RCS compensation function.

4. The system of claim 1, wherein execution of the instructions by the processor further causes the processor to smooth the function.

5. The system of claim 1, wherein execution of the instructions by the processor causes the processor to further:
separate the field of view of the range sensor into a plurality of bins, wherein each of the bins represents a different range of angles within the field of view of the range sensor, and
sort detection information from the plurality of sensor calibration datasets into the plurality of bins.

6. The system of claim 1, wherein execution of the instructions by the processor causes the processor to further:
apply a filter to the plurality of sensor calibration datasets prior to generating the function.

7. The system of claim 1, wherein automatically modifying the plurality of sensor post-calibration datasets based the function comprises automatically subtracting amounts corresponding to the function from corresponding points of the each of the plurality of sensor post-calibration datasets.

8. The system of claim 1, wherein execution of the instructions by the processor causes the processor to further identify, in the plurality of sensor calibration datasets, representations of a plurality of sensor targets.

9. The system of claim 1, wherein the vehicle is rotated into a plurality of vehicle positions by a motorized turntable over a course of the calibration time period, wherein the range sensor captures at least one of the plurality of sensor calibration datasets when the vehicle is at each of the plurality of vehicle positions.

10. The system of claim 1, wherein the range sensor captures at least one of the plurality of sensor calibration datasets while the vehicle is at one or more vehicle positions along a predetermined route driven by the vehicle during a calibration time period.

11. The system of claim 1, wherein execution of the instructions by the processor further causes the processor to apply a filter to one or more of the plurality of sensor calibration datasets prior to applying the function.

12. A computer-implemented method for vehicle sensor calibration, the method comprising:
receiving a plurality of sensor calibration datasets during a calibration time period from a range sensor coupled to a vehicle, wherein the range sensor tracks range data within a field of view that includes a portion of an environment of the vehicle, wherein the range sensor is a radio detection and ranging (RADAR) sensor, and wherein the strength values of sensor detections of the plurality of sensor calibration datasets over the field of view plotted in the function are radio detection and ranging (RADAR) cross section (RCS) values;
generating a function plotting strength values of the plurality of sensor calibration datasets over the field of view against angles within the field of view;
receiving, from the range sensor, a plurality of post-calibration sensor datasets captured by the range sensor after the calibration time period; and
automatically modifying the plurality of sensor post-calibration datasets based on the function.

13. The method of claim 12, wherein the angles within the field of view of the environment of the vehicle are angles relative to a direction that the range sensor is facing.

14. The method of claim 12, wherein the function is an RCS compensation function.

15. The method of claim 12, further comprising:
separating the field of view of the range sensor into a plurality of bins, wherein each of the bins represents a different range of angles within the field of view of the range sensor; and
sorting detection information from the plurality of sensor calibration datasets into the plurality of bins.

16. The method of claim 12, further comprising:
applying a median filter to the plurality of sensor calibration datasets prior to generating the function.

17. The method of claim 12, further comprising smoothing the function.

18. A non-transitory computer readable storage medium having embodied thereon instructions, wherein the instructions are executable by a processor to perform a method of vehicle sensor calibration, the method comprising:
receiving a plurality of sensor calibration datasets during a calibration time period from a range sensor coupled to a vehicle, wherein the range sensor tracks range data within a field of view that includes a portion of an environment of the vehicle wherein the range sensor is a radio detection and ranging (RADAR) sensor, and wherein the strength values of sensor detections of the plurality of sensor calibration datasets over the field of view plotted in the function are radio detection and ranging (RADAR) cross section (RCS) values;
generating a function plotting strength values of the plurality of sensor calibration datasets over the field of view against angles within the field of view;
receiving, from the range sensor, a plurality of post-calibration sensor datasets captured by the range sensor after the calibration time period; and
automatically modifying the plurality of sensor post-calibration datasets based on the function.

* * * * *